(12) United States Patent
Nam et al.

(10) Patent No.: US 12,013,778 B2
(45) Date of Patent: Jun. 18, 2024

(54) STORAGE DEVICE CONFIGURED TO UPDATE HOTNESSES OF RECEIVED LOGICAL ADDRESSES AND A METHOD OF OPERATING THE STORAGE DEVICE

(71) Applicant: SAMSUNG ELECTRONICS CO., LTD., Suwon-si (KR)

(72) Inventors: Gyeongmin Nam, Seoul (KR); Chanha Kim, Hwaseong-si (KR); Seungryong Jang, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/837,163

(22) Filed: Jun. 10, 2022

(65) Prior Publication Data

US 2023/0127606 A1 Apr. 27, 2023

(30) Foreign Application Priority Data

Oct. 26, 2021 (KR) .................. 10-2021-0143293

(51) Int. Cl.
*G06F 12/02* (2006.01)
*G06F 12/109* (2016.01)
*G06F 12/123* (2016.01)

(52) U.S. Cl.
CPC ........ *G06F 12/0246* (2013.01); *G06F 12/109* (2013.01); *G06F 12/123* (2013.01)

(58) Field of Classification Search
CPC .. G06F 12/0246; G06F 12/109; G06F 12/123; G06F 2212/1016; G06F 2212/7201; G06F 2212/7203; G06F 2212/7205; G06F 2212/7208; G06F 3/061; G06F 3/064; G06F 3/0679; G06F 12/0292
See application file for complete search history.

(56) References Cited

U.S. PATENT DOCUMENTS

| | | |
|---|---|---|
| 7,679,133 B2 | 3/2010 | Son et al. |
| 8,553,466 B2 | 10/2013 | Han et al. |
| 8,559,235 B2 | 10/2013 | Yoon et al. |
| 8,654,587 B2 | 2/2014 | Yoon et al. |
| 9,582,199 B2 | 2/2017 | Ranjith Reddy et al. |
| 10,031,671 B2 * | 7/2018 | Wang .................... G06F 3/0605 |
| 10,168,917 B2 * | 1/2019 | Dai ..................... G06F 12/0246 |
| 10,452,281 B2 | 10/2019 | Haines et al. |
| 10,922,296 B2 | 2/2021 | Gurajada et al. |

(Continued)

*Primary Examiner* — Tasnima Matin
(74) *Attorney, Agent, or Firm* — F. Chau & Associates, LLC

(57) ABSTRACT

A storage device including: a memory device including memory blocks having different bit densities; and a controller, the controller including: a memory to store a logical address list including a number of recently received logical addresses and a hotness table including a hotness of each of the logical addresses in the list; and a processor to receive a write command, a latest logical address and data, to update a hotness of the latest logical address in the hotness table, to insert the latest logical address into the logical address list, and to control the memory device to program the data into one of the memory blocks depending on whether the hotness of the latest logical address exceeds a threshold value, the hotness of the latest logical address being updated based on how long ago a logical address the same as the latest logical address was received.

20 Claims, 17 Drawing Sheets

(56) References Cited

U.S. PATENT DOCUMENTS

| | | | |
|---|---|---|---|
| 2011/0233648 A1 | 9/2011 | Seol et al. | |
| 2014/0289492 A1* | 9/2014 | Ranjith Reddy | G06F 3/0643 |
| | | | 711/170 |
| 2015/0179268 A1* | 6/2015 | Kim | G11C 11/56 |
| | | | 365/185.03 |
| 2018/0165189 A1* | 6/2018 | Tai | G06F 3/064 |
| 2018/0349424 A1 | 12/2018 | Gurajada et al. | |
| 2019/0102083 A1* | 4/2019 | Dusija | G06F 3/0679 |
| 2019/0332298 A1* | 10/2019 | Madabhushi | G06F 3/0679 |
| 2020/0393974 A1* | 12/2020 | Bahirat | G06F 3/0685 |
| 2021/0064535 A1* | 3/2021 | Han | G06F 3/0658 |

\* cited by examiner

216b

| LBA | Hotness | Last Index | Count |
|-----|---------|------------|-------|
| 11 | 3.8 → 2.6 | 9 → 11 | 3 → 2 |
| 30 | 3 | 7 | 2 |
| 7 | 2 | 3 | 1 |
| 5 | 4.4 | 10 | 3 |
| 24 | 2 → 2.8 | 5 → 11 | 1 → 2 |

| LBA | Hotness | Last Index | Count |
|---|---|---|---|
| 11 | 2.6 | 11 | 2 |
| 30 | 3 → 1 | 7 → 12 | 2 → 1 |
| 7 | 2 | 3 | 1 |
| 5 | 4.4 | 10 | 3 |
| 24 | 2.8 | 11 | 2 |
| 10 | 2 | 12 | 1 |

| LBA | Hotness | Last Index | Count |
|-----|---------|------------|-------|
| 11 | 2.6 | 11 | 2 |
| 30 | 1 → 2.8 | 12 → 13 | 1 → 2 |
| 7 | 2 | 3 | 1 |
| 5 | 4.4 | 10 | 3 |
| 24 | 2.8 | 11 | 2 |
| 10 | 2 | 12 | 1 |

S32 (Hotness), S33 (Last Index), S34 (Count), S31 (row with LBA 7)

FIG. 9B

STORAGE DEVICE CONFIGURED TO UPDATE HOTNESSES OF RECEIVED LOGICAL ADDRESSES AND A METHOD OF OPERATING THE STORAGE DEVICE

CROSS TO REFERENCE TO RELATED APPLICATION(S)

This application claims priority under 35 U.S.C. § 119 to Korean Patent Application No. 10-2021-0143293 filed on Oct. 26, 2021 in the Korean Intellectual Property Office, the disclosure of which is incorporated by reference herein in its entirety.

TECHNICAL FIELD

Example embodiments of the present disclosure relate to a storage controller, a storage device and a method of operating a storage device.

DISCUSSION OF RELATED ART

A computer system may include various types of memory systems, and such memory systems may include a memory device and a controller in communication with a host. In such a memory system, the memory device may be used to store data, and may include a volatile memory device which requires power to store data or a nonvolatile memory device which can store data in the absence of power. Such a memory device may include first and second memory regions having different degrees of performance. In this case, a write speed to the first memory region and a write speed to the second memory region may be different from each other. For example, the write speed to the first memory region may be faster than the write speed to the second memory region.

SUMMARY

An example embodiment of the present disclosure provides configurations and operations related to a storage device for storing hot data and cold data in a divided manner in memory blocks having different bit densities.

An example embodiment of the present disclosure provides a storage device in which the amount of computation for determining hotness may be reduced when hotness of a latest logical address is determined based on a predetermined number of recently received logical addresses from a host.

According to an example embodiment of the present disclosure, a storage device includes: a memory device including a plurality of memory blocks having different bit densities; and a controller configured to control the memory device, wherein the controller includes: a memory configured to store a logical address list including a number of recently received logical addresses and a hotness table including a hotness of each of the logical addresses included in the logical address list; and a processor configured to receive a write command, a latest logical address and data from a host, to update a hotness of the latest logical address in the hotness table, to insert the latest logical address into the logical address list, and to control the memory device to program the data into one of the plurality of memory blocks depending on whether the hotness of the latest logical address exceeds a threshold value, wherein the hotness of the latest logical address is updated based on how long ago a logical address the same as the latest logical address was received.

According to an example embodiment of the present disclosure, there is provided a method of operating a storage device including first memory blocks and second memory blocks having different bit densities, the method including: receiving a write command, a latest logical address and data from a host; updating a hotness of the oldest logical address in a logical address list that includes a number of recently received logical addresses, wherein the hotness of the oldest logical address is updated based on how long ago a logical address the same as the oldest logical address was received; updating a hotness of the latest logical address, wherein the hotness of the latest logical address is updated based on how long ago a logical address the same as the latest logical address was received; and storing the data in the first memory block or the second memory block depending on whether the hotness of the latest logical address is greater than a threshold value.

According to an example embodiment of the present disclosure, there is provided a controller configured to control a memory device including a plurality of memory blocks having different bit densities, the controller including: a memory configured to store a logical address list including a number of recently received logical addresses; and a processor configured to receive a write command, a latest logical address and data from a host, to update a hotness of the latest logical address, to insert the latest logical address into the logical address list, and to control the memory device to store the data in one of the memory blocks having different bit densities according to the hotness of the latest logical address, wherein the hotness of the latest logical address is updated based on how long ago a logical address the same as the latest logical address was received.

BRIEF DESCRIPTION OF THE DRAWINGS

The above and other features of the present disclosure will be more clearly understood from the following detailed description, taken in conjunction with the accompanying drawings, in which:

FIGS. 7A, 7B, 8A, 8B, 9A and 9B are diagrams illustrating a method of updating hotness according to an example embodiment of the present disclosure;

DETAILED DESCRIPTION OF THE EMBODIMENTS

Hereinafter, example embodiments of the present disclosure will be described with reference to the accompanying drawings.

Figure 1:
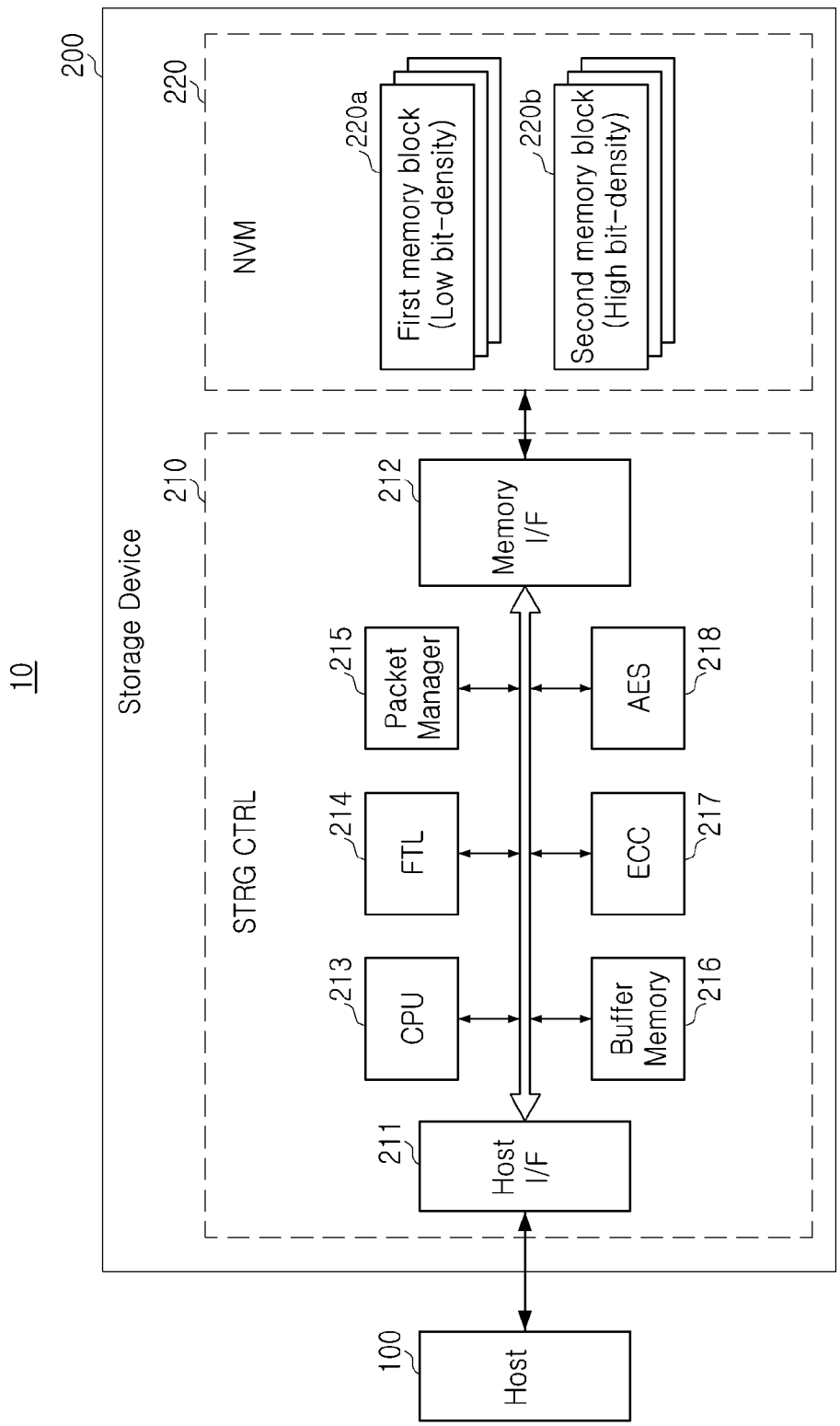
FIG. 1 is a block diagram illustrating a host-storage system according to an example embodiment of the present disclosure.

FIG. 1 is a block diagram illustrating a host-storage system according to an example embodiment of the present disclosure.

The host-storage system 10 may include a host 100 and a storage device 200. The storage device 200 may include a storage controller 210 and a nonvolatile memory (NVM) 220.

The host 100 may include an electronic device, such as, for example, portable electronic devices such as a mobile phone, an MP3 player, a laptop computer, and the like, or electronic devices such as a desktop computer, a gaming device, a TV, a projector, and the like. The host 100 may include at least one operating system (OS). The operating system may manage and control overall functions and operations of the host 100.

The storage device 200 may include storage media for storing data in response to a request from the host 100. As an example, the storage device 200 may include at least one of a solid state drive (SSD), an embedded memory, and a removable external memory. When the storage device 200 is an SSD, the storage device 200 may conform to a nonvolatile memory express (NVMe) standard. When the storage device 200 is an embedded memory or an external memory, the storage device 200 may conform to a universal flash storage (UFS) or an embedded multimedia card (eMMC) standard. The host 100 and the storage device 200 may generate a packet according to an employed standard protocol and may transmit the packet.

The nonvolatile memory 220 may maintain stored data even when power is not supplied. The nonvolatile memory 220 may store data provided from the host 100 through a program (or write) operation, and may output data stored in the nonvolatile memory 220 through a read operation. The nonvolatile memory 220 may include a plurality of memory blocks, each of the plurality of memory blocks may include a plurality of pages, and each of the pages may include a plurality of memory cells connected to a word line. In an example embodiment of the present disclosure, the nonvolatile memory 220 may be implemented by a flash memory.

When the nonvolatile memory 220 of the storage device 200 includes a flash memory, the flash memory may include a two-dimensional (2D) NAND memory array or a three-dimensional (3D) (or vertical) NAND (VNAND) memory array. As another example, the storage device 200 may include other various types of nonvolatile memories. For example, the storage device 200 may include a magnetic random access memory (RAM) (MRAM), a spin-transfer torque MRAM (MRAM), a conductive bridging RAM (CBRAM), a ferroelectric RAM (FeRAM), a phase-change RAM (PRAM), a resistive memory (e.g., resistive RAM) and various other types of memory.

The storage controller 210 may include a host interface 211, a memory interface 212, and a central processing unit (CPU) 213. In addition, the storage controller 210 may include a flash translation layer (FTL) 214, a packet manager 215, a buffer memory 216, an error correction code (ECC) 217 engine, and an advanced encryption standard (AES) engine 218. The storage controller 210 may further include a working memory into which the flash translation layer (FTL) 214 is loaded, and as the CPU 213 executes the flash translation layer 214, operations of writing and reading data may be controlled with respect to the nonvolatile memory 220.

The host interface 211 may transmit a packet to and receive a packet from the host 100. A packet transmitted from the host 100 to the host interface 211 may include a command or data to be written to the nonvolatile memory 220, and a packet transmitted from the host interface 211 to the host 100 may include a response to a command or data read from the nonvolatile memory 220.

The memory interface 212 may transmit data to be written to the nonvolatile memory 220 to the nonvolatile memory 220 or may receive data read from the nonvolatile memory 220. The memory interface 212 may be implemented to comply with a standard protocol such as a toggle or an open NAND flash interface (ONFI).

The flash translation layer 214 may perform various functions such as address mapping, wear-leveling, and garbage collection. The address mapping operation may be an operation of changing a logical address received from the host 100 into a physical address used to actually store data in the nonvolatile memory 220. Wear-leveling may be a technique for preventing excessive degradation of a specific block by ensuring that blocks in the nonvolatile memory 220 are used uniformly, and the wear-leveling may be implemented through a firmware technique for balancing erase counts of physical blocks, for example. Garbage collection is a technique for securing usable capacity in the nonvolatile memory 220 by copying valid data of a block to a new block and erasing an existing block.

The packet manager 215 may generate a packet according to a protocol of the interface negotiated with the host 100 or may parse various pieces of information from the packet received from the host 100. In addition, the buffer memory 216 may temporarily store data to be written to the nonvolatile memory 220 or data to be read from the nonvolatile memory 220. The buffer memory 216 may be provided in the storage controller 210, but may be disposed externally of the storage controller 210.

The ECC engine 217 may perform a function of detecting and correcting an error in read data read from the nonvolatile memory 220. For example, the ECC engine 217 may generate parity bits for write data to be written to the nonvolatile memory 220, and the generated parity bits may be stored in the nonvolatile memory 220 together with the write data. When data is read from the nonvolatile memory 220, the ECC engine 217 may correct an error of the read data using parity bits read from the nonvolatile memory 220 together with the read data, and may output the error-corrected read data.

The AES engine 218 may perform at least one of an encryption operation and a decryption operation for data input to the storage controller 210 using a symmetric-key algorithm.

The nonvolatile memory 220 may include first memory blocks 220a and second memory blocks 220b having different bit densities. Bit density of a memory block may refer to the number of data bits which a memory cell included in the corresponding memory block may store. In the example in FIG. 1, the first memory blocks 220a may have a relatively low bit density as compared to that of the second memory blocks 220b. In other words, the number of bits stored in a single memory cell of the first memory blocks 220a may be relatively smaller than that of the second memory blocks 220b.

The first memory blocks 220a and the second memory blocks 220b having different bit densities may have different properties. For example, the second memory blocks 220b may provide a larger storage capacity than that of the first memory blocks 220a in the same size of area. However, the first memory blocks 220a may have a faster access speed and a longer lifespan than those of the second memory blocks 220b.

In a case where data having different attributes are stored separately in memory blocks having different attributes, the nonvolatile memory 220 may be efficiently used. For example, in a case where hot data, which is data relatively frequently accessed, is stored in the first memory blocks 220a, an access speed of the hot data may improve, and average performance of the storage device 200 may improve. In a case where cold data, which is data relatively infrequently accessed, is stored in the second memory blocks 220b, the data stored in the second memory blocks 220b may be rarely updated, and deterioration in lifespan of the second memory blocks 220b may be alleviated.

Whether data is hot data or cold data may be determined in relation to other data. In order to determine which data is hot data or cold data, hotness, which is a numerical value indicating a degree to which each unit data is frequently accessed, may be determined. Which data is frequently accessed by the host 100 may vary over time. In other words, the degree to which unit data is frequently accessed may be changed in real time. To reflect the access tendency changing over time in hotness of each unit data, the storage device 200 may update hotness of each unit data every time data is accessed from the host 100. However, this may require excessive computation of the storage device 200.

In an example embodiment of the present disclosure, the storage device 200 may update hotness of data by reflecting an elapse index indicating how long ago the data was accessed each time data is accessed. This way, the storage device 200 may reflect an access tendency changing over time in hotness when updating hotness of the latest data. Accordingly, the storage device 200 may determine hotness for each unit of data without manually updating hotness for each unit of data each time data is accessed from the host 100. In an example embodiment of the present disclosure, the amount of computation of the storage device 200 for classifying data having different properties may be reduced, such that access performance of the storage device 200 may improve.

Hereinafter, before describing the operation of the storage device 200 in an example embodiment of the present disclosure, memory blocks having different properties included in the nonvolatile memory 220 will be described in greater detail.

Figure 2:
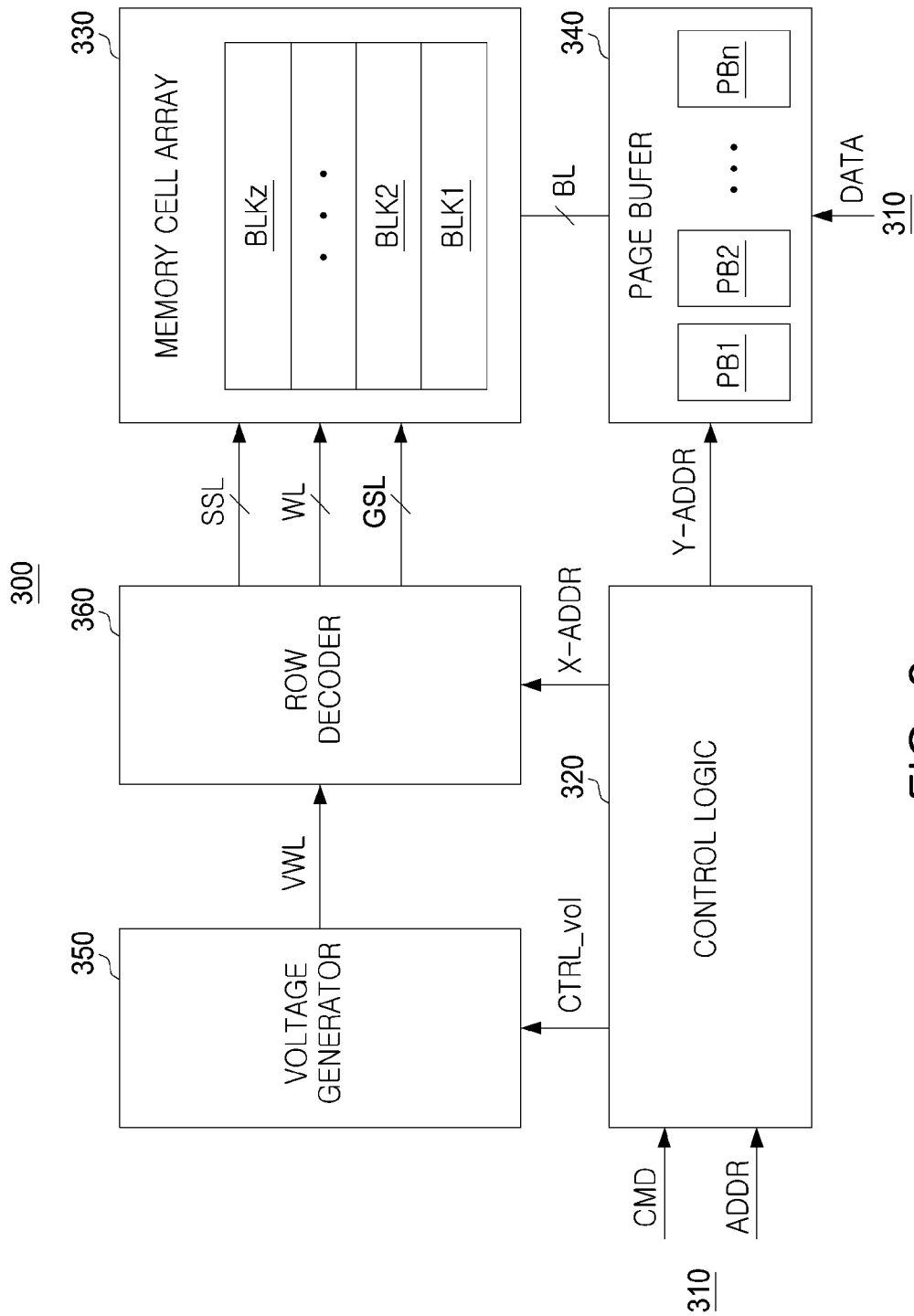
FIGS. 2, 3 and 4 are diagrams illustrating memory blocks included in a nonvolatile memory according to an example embodiment of the present disclosure.

FIG. 2 is a block diagram illustrating a memory device. Referring to FIG. 2, the memory device 300 may include a control logic circuit 320, a memory cell array 330, a page buffer 340, a voltage generator 350, and a row decoder 360. The memory device 300 may further include a memory interface circuit 310, and may further include a column logic, a predecoder, a temperature sensor, a command decoder, an address decoder, and the like.

The control logic circuit 320 may control various operations in the memory device 300. The control logic circuit 320 may output various control signals in response to a command CMD and/or an address ADDR from the memory interface circuit 310. For example, the control logic circuit 320 may output a voltage control signal CTRL_vol to the voltage generator 350, a row address X-ADDR to the row decoder 360, and a column address Y-ADDR to the page buffer 340.

The memory cell array 330 may include a plurality of memory blocks BLK1 to BLKz (z is a positive integer), and each of the plurality of memory blocks BLK1 to BLKz may include a plurality of memory cells. The memory cell array 330 may be connected to the page buffer unit 340 via bit lines BL, and may be connected to the row decoder 360 via word lines WL, string select lines SSL, and ground select lines GSL.

In an example embodiment of the present disclosure, the memory cell array 330 may include a 3D memory cell array, and the 3D memory cell array may include a plurality of NAND strings. Each NAND string may include memory cells connected to word lines stacked vertically on a substrate. U.S. Pat. Nos. 7,679,133, 8,553,466, 8,654,587, 8,559,235, and U.S. Patent Application Publication No. 2011/0233648 are incorporated herein by reference in their entireties. In an example embodiment of the present disclosure, the memory cell array 330 may include a 2D memory cell array, and the 2D memory cell array may include a plurality of NAND strings arranged in the directions of rows and columns.

The page buffer 340 may include a plurality of page buffers PB1 to PBn (n is an integer equal to or greater than 3), and the plurality of page buffers PB1 to PBn may be connected to the memory cells via a plurality of bit lines BL. The page buffer 340 may select at least one bit line among the bit lines BL in response to the column address Y-ADDR. The page buffer 340 may operate as a write driver or a sense amplifier depending on an operation mode. For example, during a program operation, the page buffer 340 may apply a bit line voltage corresponding to data to be programmed to a selected bit line. During a read operation, the page buffer 340 may sense data stored in the memory cell by sensing a current or voltage of a selected bit line.

The voltage generator 350 may generate various types of voltages for performing program, read, and erase operations based on the voltage control signal CTRL_vol. For example, the voltage generator 350 may generate a program voltage, a read voltage, a program verify voltage, an erase voltage, and the like, as a word line voltage VWL.

The row decoder 360 may select one of the plurality of word lines WL and may select one of the plurality of string selection lines SSL in response to the row address X-ADDR. For example, during a program operation, the row decoder 360 may apply a program voltage and a program verify voltage to a selected word line, and during a read operation, the row decoder 360 may apply a read voltage to the selected word line.

Figure 3:
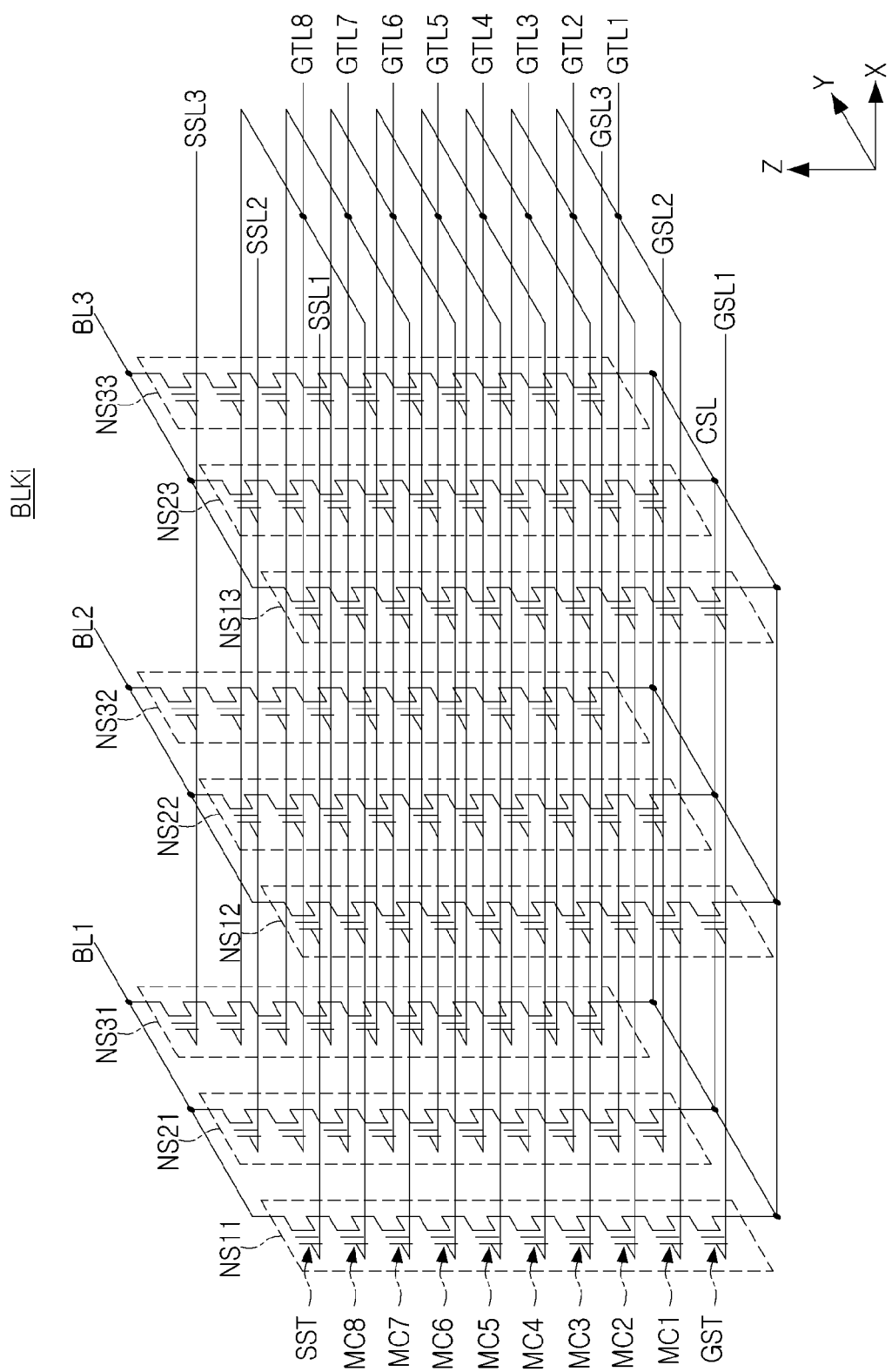

FIG. 3 is a diagram illustrating a 3D V-NAND structure applicable to a storage device according to an example embodiment of the present disclosure. When the nonvolatile memory of the storage device is implemented as a 3D V-NAND type flash memory, each of a plurality of memory blocks included in the nonvolatile memory may be represented by an equivalent circuit as illustrated in FIG. 3.

The memory block BLKi illustrated in FIG. 3 may represent a 3D memory block formed in a 3D structure on a substrate. For example, a plurality of memory NAND strings included in the memory block BLKi may be formed in a direction perpendicular to the substrate.

Referring to FIG. 3, the memory block BLKi may include a plurality of memory NAND strings NS11, NS12, NS13, NS21, NS22, NS23, NS31, NS32 and NS33 connected between bit lines BL1, BL2, and BL3 and a common source line CSL. Each of the plurality of memory NAND strings NS11 to NS33 may include a string select transistor SST, a plurality of memory cells MC1, MC2, MC3, MC4, MC5, MC6, MC7, and MC8, and a ground select transistor GST. Each of the plurality of memory NAND strings NS11 to NS33 may include eight memory cells MC1, MC2, ..., MC8 in FIG. 3, but the present disclosure is not limited thereto.

The string select transistor SST may be connected to corresponding string select lines SSL1, SSL2, and SSL3. The plurality of memory cells MC1, MC2, ..., MC8 may be connected to corresponding gate lines GTL1, GTL2, GTL3, GTL4, GTL5, GTL6, GTL7, and GTL8, respectively. The gate lines GTL1, GTL2, ..., GTL8 may be word lines, and a portion of the gate lines GTL1, GTL2, ..., GTL8 may be dummy word lines. The ground select transistor GST may be connected to corresponding ground select lines GSL1, GSL2, and GSL3. The string select transistor SST may be connected to corresponding bit lines BL1, BL2, and BL3, and the ground select transistor GST may be connected to the common source line CSL.

A word line (e.g., WL1) on the same level may be connected in common, and the ground selection lines GSL1, GSL2, GSL3 and the string selection lines SSL1, SSL2, SSL3 may be isolated from each other. The memory block BLKi may be connected to eight gate lines GTL1, GTL2, ..., GTL8 and three bit lines BL1, BL2, BL3 in FIG. 3, but the present disclosure is not limited thereto.

The memory block BLKi may have different bit densities depending on the number of bits stored by the memory cells included in the memory block BLKi.

Figure 4:
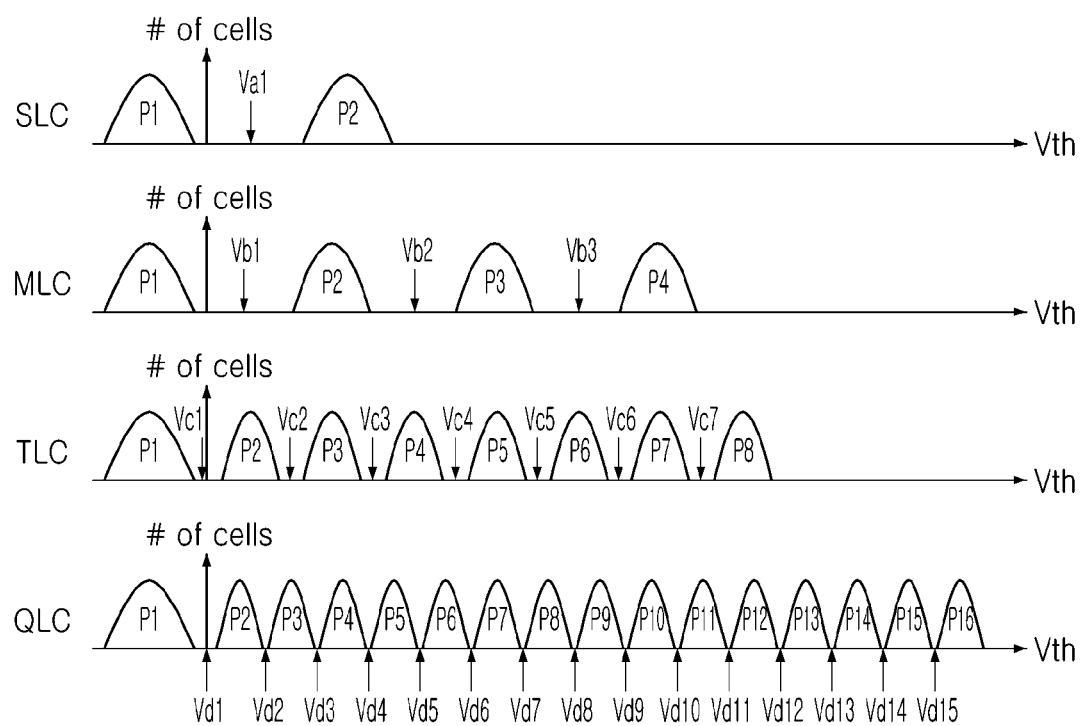

FIG. 4 is a diagram illustrating the distribution of a threshold voltage depending on the number of bits stored in a memory cell.

Referring to FIG. 4, the horizontal axis of each graph indicates the magnitude of the threshold voltage Vth, and the vertical axis indicates the number of memory cells.

When the memory cell is a single level cell (SLC) storing 1-bit data, the memory cell may have a threshold voltage corresponding to one of the first program state P1 and the second program state P2. The read voltage Va1 may be a voltage for distinguishing the first program state P1 from the second program state P2. Since the memory cell having the first program state P1 has a lower threshold voltage than the read voltage Va1, the memory cell may be read as an on-cell. Since the memory cell having the second program state P2 has a threshold voltage higher than the read voltage Va1, the memory cell may be read as an off-cell.

When the memory cell is a multiple level cell (MLC) storing 2-bit data, the memory cell may have a threshold voltage corresponding to one of the first, second, third and fourth program states P1, P2, P3 and P4. The first, second and third read voltages Vb1, Vb2 and Vb3 may be read voltages for distinguishing each of the first to fourth program states P1 to P4. The first read voltage Vb1 may be a read voltage for distinguishing the first program state P1 from the second program state P2. The second read voltage Vb2 may be a read voltage for distinguishing the second program state P2 from the third program state P3. The third read voltage Vb3 may be a read voltage for discriminating the third program state P3 from the fourth program state P4.

When the memory cell is a triple level cell (TLC) storing 3-bit data, the memory cell may have a threshold voltage corresponding to one of the first, second, third, fourth, fifth, sixth, seventh and eighth program states P1, P2, P3, P4, P5, P6, P7 and P8. The first, second, third, fourth, fifth, sixth and seventh read voltages Vc1, Vc2, Vc3, Vc4, Vc5, Vc6 and Vc7 may be read voltages for distinguishing each of the first to eighth program states P1 to P8. The first read voltage Vc1 may be a read voltage for distinguishing the first program state P1 from the second program state P2. The second read voltage Vc2 may be a read voltage for distinguishing the second program state P2 from the third program state P3. Similarly, the seventh read voltage Vc7 may be a read voltage for distinguishing the seventh program state P7 from the eighth program state P8.

When the memory cell is a quadruple level cell (QLC) storing 4-bit data, the memory cell may have one of first, second, third, fourth, fifth, sixth, seventh, eighth, ninth, tenth, eleventh, twelfth, thirteenth, fourteenth, fifteenth and sixteenth program states P1, P2, P3, P4, P5, P6, P7, P8, P9, P10, P11, P12, P13, P14, PIS and P16. The first, second, third, fourth, fifth, sixth, seventh, eighth, ninth, tenth, eleventh, twelfth, thirteenth, fourteenth and fifteenth read voltages Vd1, Vd2, Vd3, Vd4, Vd5, Vd6, Vd7, Vd8, Vd9, Vd10, Vd11, Vd12, Vd13, Vd14 and Vd15 may be read voltages for distinguishing each of the first to sixteenth program states Pt to P16. The first read voltage Vd1 may be a read voltage for distinguishing the first program state P1 from the second program state P2. The second read voltage Vd2 may be a read voltage for distinguishing the second program state P2 from the third program state P3. Similarly, the fifteenth read voltage Vd15 may be a read voltage for distinguishing the fifteenth program state P15 from the sixteenth program state P16.

FIG. 4 illustrates SLC, MLC, TLC, and QLC as an example, but the memory cell may be a penta-level cell (PLC) storing 5-bit data or a multi-level memory cell storing 6-bit or more data.

When a memory block has a higher bit density, there may be an increase in the number of program states formed in memory cells of the corresponding memory block and the number of read voltages for classifying program states. Accordingly, the higher the bit density, there is an increase in both the program operation time for forming each program state and the read operation time for classifying program states, such that an access speed may decrease.

In a case in which programming and erasing are repeated in the memory block, the memory cell may be deteriorated. In a case in which the memory cells are deteriorated, each program state of the memory cells may not be precisely programmed. In a memory block having a higher bit density, each program state may have to be programmed more precisely. Therefore, when the bit density of the memory block is high, the memory block may expire at lower erase counts.

In a case in which the storage device may classify and store data in memory blocks having different bit densities based on hotness of the data, access performance and lifespan of the storage device may improve. In an example embodiment of the present disclosure, the storage device 200 may quickly determine hotness of each unit of data by updating hotness of the minimum amount of data along with unit data recently accessed. Accordingly, access performance of the storage device may improve.

Hereinafter, an operation of the storage device will be described in detail according to an example embodiment of the present disclosure with reference to FIGS. 5 to 10.

Figure 5:
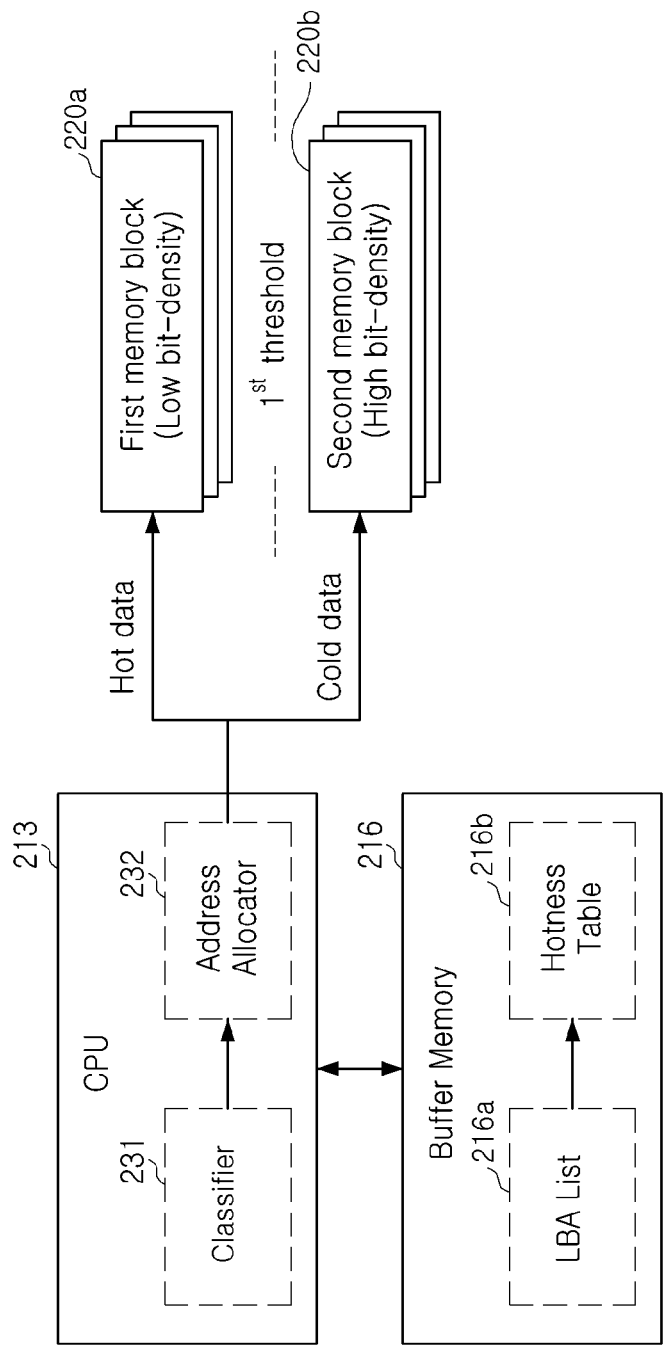
FIG. 5 is a diagram illustrating operations of a storage device according to an example embodiment of the present disclosure.

FIG. 5 is a diagram illustrating operations of a storage device according to an example embodiment of the present disclosure.

FIG. 5 illustrates the CPU 213, the buffer memory 216, the first memory blocks 220a and the second memory blocks 220b of the storage device 200 described with reference to FIG. 1.

The CPU 213 may determine hotness of data received from the host 100 with reference to information stored in the buffer memory 216, and may control the nonvolatile memory 220 such that the data may be stored in a first memory block 220a or a second memory block 220b depending on the hotness of the data. The first memory block 220a may be a memory block having a relatively low bit density, and the second memory block 220b may be a memory block having a relatively high bit density. For example, the first memory block 220a may be an SLC memory block, and the second memory block 220b may be a TLC memory block or a QLC memory block, but the present disclosure is not limited thereto. In other words, the bit density of the first memory block 220a may be lower than the bit density of the second memory block 220b, and is not limited to a specific bit density.

The CPU 213 may drive a classifier 231 and an address allocator 232. The classifier 231 and the address allocator 232 may be loaded into a working memory and may be driven by the CPU 213. For example, the classifier 231 and the address allocator 232 may be included in the flash translation layer 214 described with reference to FIG. 1.

The classifier 231 may determine hotness of the data received from the host 100, and may determine whether the data is hot data or cold data based on the determined hotness. For example, the classifier 231 may determine data having a hotness greater than a first threshold value as hot data, and may determine data having a hotness equal to or less than a first threshold value as cold data.

Hotness may be determined for each unit of data, and each unit of data may correspond to a logical address. The host 100 may provide a write command and data to the storage device 200 and may also provide a logical address of the data. For example, the logical address may be a logical block address (LBA) used in the file system of the host 100. The classifier 231 may determine hotness for each logical address based on a pattern in which logical addresses are received from the host 100. Hotness for each logical address may correspond to hotness of unit data corresponding to the logical address.

The buffer memory 216 may store a logical address list 216a and a hotness table 216b. The logical address list 216a may include a predetermined number of recently received logical addresses. In other words, the logical address list 216a may indicate a pattern in which logical addresses are received. The classifier 231 may determine hotness of a recently received logical address based on a pattern in which logical addresses are received. The hotness table 216b may include hotness of each of the logical addresses included in the logical address list 216a, and may be updated by the classifier 231.

The address allocator 232 may map a logical address received from the host 100 to a physical address of the nonvolatile memory 220. The address allocator 232 may perform address mapping such that data classified as hot data by the classifier 231 may be stored in a first memory block 220a which may be a memory block having relatively low bit density. In addition, the address allocator 232 may perform address mapping such that data classified as cold data by the classifier 231 may be stored in a second memory block 220b which may be a memory block having relatively high bit density.

Figure 6:
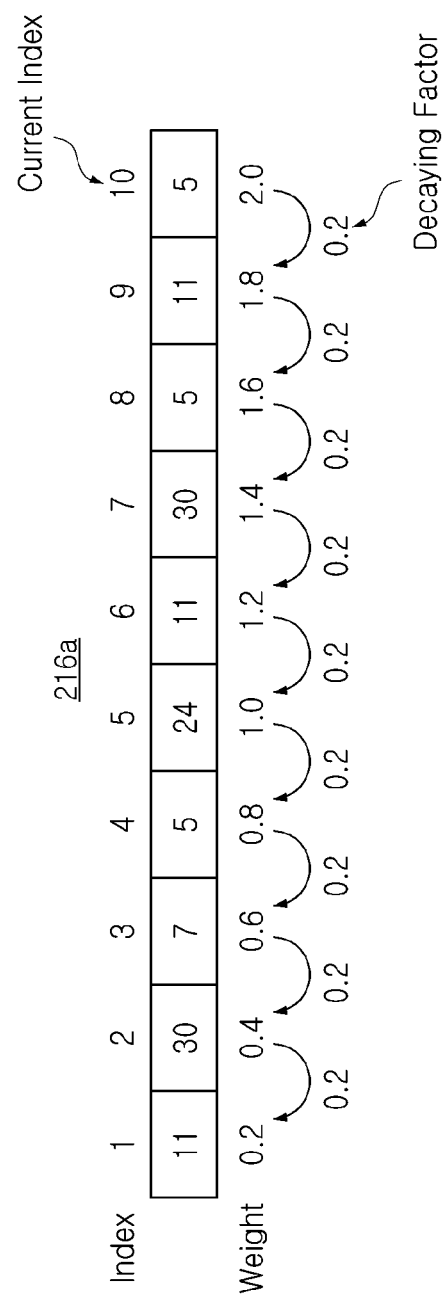
FIG. 6 is a diagram illustrating a logical address list according to an example embodiment of the present disclosure.

FIG. 6 is a diagram illustrating a logical address list according to an example embodiment of the present disclosure.

The logical address list 216a may include a predetermined number of entries. The classifier 231 may store logical addresses received with the command from the host 100 in the entries in the order in which the logical addresses were received. In the example in FIG. 6, the logical address list 216a may include 10 entries. Each of the numbers in the entries of the logical address list 216a may represent logical address values stored in the entries. The index above the entries may indicate the order in which the logical addresses were received from the host 100. The first received logical address may be "11," and the tenth received logical address may be "5." The last received logical address from the host may be "5." which is the tenth received logical address. The index of the logical address received last from the host 100 may be referred to as a current index. The current index may be incremented each time a logical address is received from the host 100.

The classifier 231 may determine a hotness of each of the logical addresses included in the logical address list 216a based on a reception pattern of logical addresses appearing in the logical address list 216a. The classifier 231 may determine the hotness of a particular logical address based on a frequency and recency at which that logical address is received. For example, the classifier 231 may increase the hotness of a particular logical address the more it is received, and the more recently it is received.

To reflect the recency of the logical address in the hotness of the logical address, the classifier 231 may reflect a weight determined according to the order in which the logical addresses are received in the hotness of the logical address. Whenever a new logical address is inserted into the logical address list 216a, the classifier 231 may provide the highest weight to the newly inserted logical address and may gradually decrease the weight of the existing logical address. In FIG. 6, the weight of the last received logical address may be the highest, e.g., 2.0, and the weight may be monotonically decreased by 0.2 whenever a logical address is received, such that the weight may decrease as the order in which the logical addresses are received becomes older. Hereinafter, the weight of the last received logical address is referred to as a maximum weight, and the interval at which the weight decreases may be referred to as a decaying factor. In an example embodiment of the present disclosure, the decaying factor may be determined as a value obtained by dividing the maximum weight by the number of entries in the logical address list 216a. In the example in FIG. 6, the maximum weight may be 2.0, and the decaying factor may be 0.2.

In a case in which the classifier 231 needs to add a maximum weight to a hotness of the newly inserted logical address whenever a new logical address is inserted into the logical address list 216a, and to update the hotness of all existing logical addresses to reflect the reduced weight of the existing logical addresses, excessive computations by the CPU 213 may be required. A logical address list 216a having a larger number of entries may be used to determine the hotness of logical addresses due to a trend toward higher capacity of nonvolatile memories. As the logical address list 216a determines hotness with respect to a greater number of logical addresses using a greater number of entries, the amount of computation by the CPU 213 may further increase.

In an example embodiment of the present disclosure, the classifier 231 may update hotness by further reflecting an elapse index in hotness of the logical address newly inserted into the logical address list 216a. The elapse index may indicate how long ago a logical address the same as the newly inserted logical address was received. For example, the classifier 231 may add a relatively high value to the hotness of a logical address when a logical address that has been recently received is received again, and when a logical address received a long time ago is received again, the classifier 231 may add a relatively low value to hotness of the logical address. In other words, the classifier 231 may increase the hotness of the newly inserted logical address if the same logical address has been recently received and decrease the hotness of the newly inserted logical address is the same logical address was received a long time ago.

In an example embodiment of the present disclosure, since the classifier 231 may reflect the elapse index reflecting the access tendency of existing logical addresses to the hotness of the logical address newly inserted into the logical address list 216a, even when the hotness of the existing logical addresses is not individually updated, the relative hotness between the newly inserted logical address and the existing logical addresses may be determined. The storage controller 210 may quickly classify whether data corresponding to the newly inserted logical address is hot data or cold data, and may store hot data and cold data separately in the nonvolatile memory 220. Accordingly, the computational burden of the storage device 200 may be reduced, and access performance may improve.

Hereinafter, a method of updating hotness will be described according to an example embodiment of the present disclosure in detail with reference to FIGS. 7A to 9B.

Figure 7A:
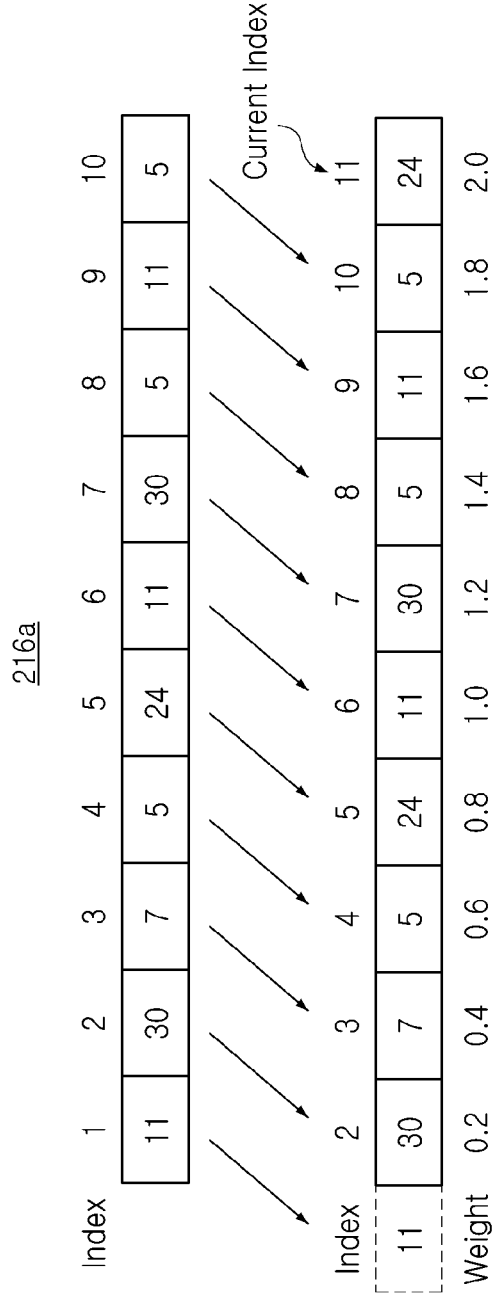

FIG. 7A illustrates an example in which a logical address is newly inserted into the logical address list 216a described with reference to FIG. 6. For example, the eleventh received logical address "24" from the host 100 may be inserted into the logical address list 216a, and the first received logical address "11" from the host 100 may be removed from the logical address list 216a. In the example in FIG. 7A, the current index may be updated to "11."

In an example embodiment of the present disclosure, the classifier 231 may, by updating logical address "24" newly inserted into the logical address list 216a and logical address "11" removed from the logical address list 216a among logical addresses included in the logical address list 216a, quickly determine a hotness of each of the logical addresses. Hereinafter, a logical address newly inserted into the logical address list 216a may be referred to as a latest logical address, and a logical address removed from the logical address list 216a may be referred to as an oldest logical address.

FIG. 7B illustrates a hotness table including hotness of logical addresses included in a logical address list.

The hotness table 216b may include hotness, a last index, and a count of each of the logical addresses included in the logical address list 216a. The last index may be an index of when hotness of each logical address was last updated, and the count may indicate the number of each logical address included in the logical address list 216a. FIG. 7B may correspond to the logical address list 216a in FIG. 7A.

When the latest logical address is received from the host 100, the classifier 231 may update the hotness of the oldest logical address in the logical address list 216a before inserting the latest logical address into the logical address list 216a.

In operation S11, the classifier 231 may update hotness by reflecting the elapse index in hotness of the oldest logical address "11."

The elapse index of the oldest logical address may indicate how long ago a logical address having the same value as that of the oldest logical address was received. The classifier 231 may further reduce hotness of the logical address as the elapse index of the logical address increases. For example, in operation S11, the hotness of the oldest logical address may be reduced from 3.8 to 2.6.

Referring to FIG. 7A, the logical address having the same value as that of the oldest logical address "11" may have been received from the host 100 in the 6th time and the 9th time. The order in which the logical address "11" was last received, in other words, the last index may be determined as "9." The classifier 231 may determine the elapse index of logical address "11" as "2" based on the current index "11" and the last index "9" of the logical address "11," and may decrease hotness by reflecting the determined elapse index to hotness. In example embodiments of the present disclosure, the classifier 231 may further reduce the previous hotness as a large number of logical addresses having the same value as that of the oldest logical address are stored in the logical address list 216a.

For example, the classifier 231 may determine hotness of the oldest logical address based on Equation 1 below:

$$\text{(hotness)} = \text{(previous hotness)} - \text{(elapse index)} \ast \text{(decaying factor)} \ast \text{(count)} \qquad \text{[Equation 1]}$$

The previous hotness may indicate hotness of the oldest logical address before being updated. The elapse index may be determined by subtracting the last index of the oldest logical address from the current index as described above, the decaying factor may be a constant as described with reference to FIG. 6, and the count may indicate the number of logical addresses having the same value as that of the old logical address. In a case in which the previous hotness of the logical address "11" in the logical address list in FIG. 6 was "3.8," the classifier 231 may update the hotness column with new hotness "2.6", which may be obtained by subtracting "1.2" obtained by multiplying the recency index "2," the decaying factor "0.2," and the count "3."

After hotness of the logical address "11" is updated, in operation S12, the classifier 231 may update the last index of the logical address "11" to the current index "11."

In operation S13, the classifier 231 may remove the oldest logical address "11" from the logical address list 216a, and may update the count of the logical address "11" from "3" to "2."

The classifier 231 may update the hotness of the latest logical address after the oldest logical address is removed from the logical address list 216a, and may insert the latest logical address into the logical address list 216a.

In operation S14, the classifier 231 may update hotness by reflecting the elapse index in hotness of the latest logical address "24."

The elapse index of the latest logical address may indicate how long ago a logical address having the same value as that of the latest logical address was received. Referring to FIG. 7A, the latest logical address "24" had also been received in the 5th time from the host 100. The classifier 231 may determine the last index of the logical address "24" as "5," may determine the elapse index as "6" based on the current index "II" and the last index "5," and may reflect the determined elapse index to hotness.

For example, the classifier 231 may determine hotness of the latest logical address based on Equation 2 below.

$$\text{(hotness)} = \text{(previous hotness)} - \text{(elapse index)} \ast \text{(decaying factor)} \ast \text{(count)} + \text{(maximum weight)} \qquad \text{[Equation 2]}$$

The previous hotness may indicate hotness of the latest logical address before being updated. The elapse index may be determined as a value obtained by subtracting the last index of the latest logical address from the current index as described above. The decaying factor and the maximum weight may be constants, and as described with reference to FIG. 6, the decaying factor may be determined as a value obtained by dividing the maximum weight by the number of entries in the logical address list 216a. In addition, the count may indicate the number of logical addresses having the same value as the latest logical address.

According to Equation 2, a larger value may be added to the previous hotness as the latest logical address has been recently received. In a case in which the previous hotness of the logical address "24" in the logical address list 216a in FIG. 6 was "2," by reflecting the recency index "6," the decaying factor "0.2," the maximum weight "2." and the count "1," new hotness "2.8" may be updated in the hotness table 216b.

In operation S15, the classifier 231 may insert the latest logical address "24" into the hotness table 216b, and may update the last index with the current index "11." In operation S16, the count of the logical address "24" may be updated from "1" to "2."

Figure 8A:
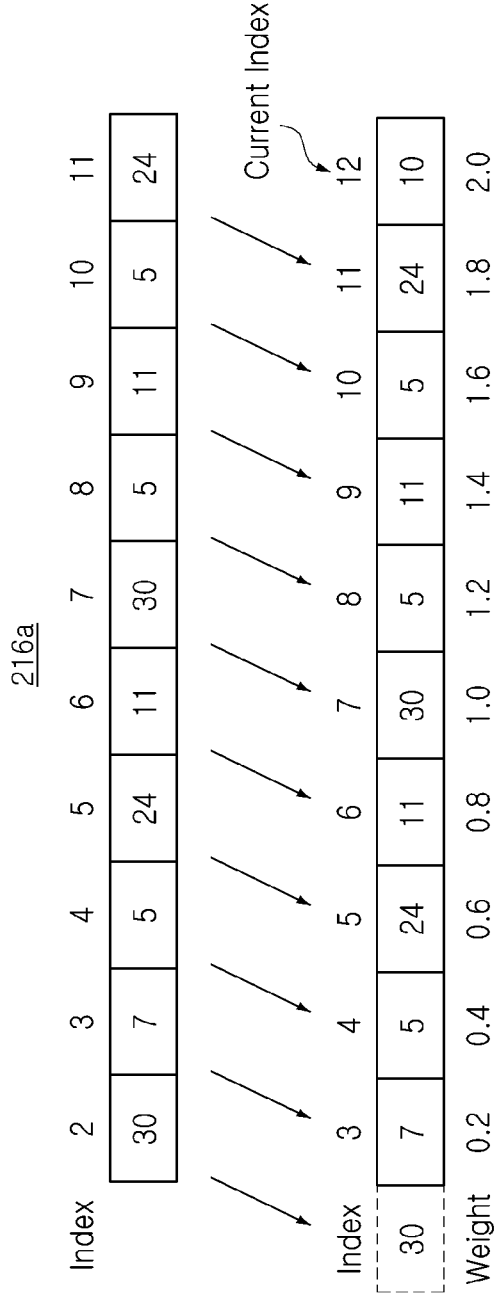

FIG. 8A illustrates an example in which a logical address is newly inserted into the logical address list 216a described with reference to FIG. 7A.

FIG. 8A illustrates an example in which the twelfth received logical address "10" from the host 100 is inserted into the logical address list 216a and the second received logical address "30" is removed from the logical address list 216a. The current index may be updated to "12." In the example in FIG. 8A, the logical address "10" may be a logical address not inserted into the existing logical address list 216a. The classifier 231 may determine hotness of the logical address "10" and add hotness of the logical address "10" to the hotness table 216b.

Figure 8B:
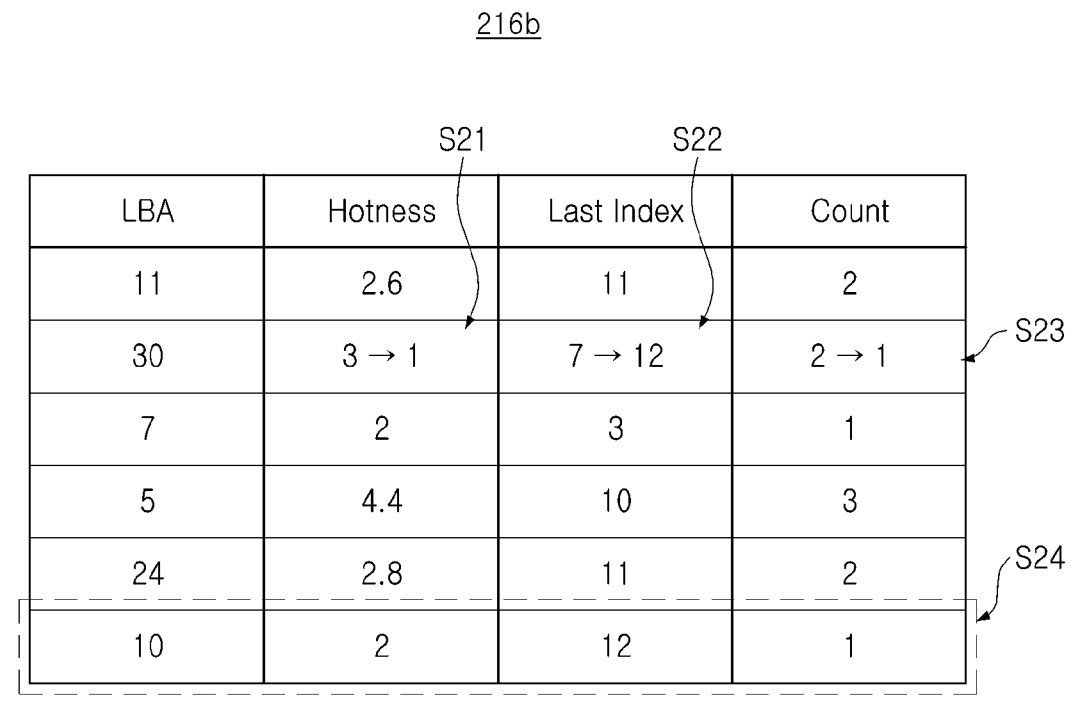

FIG. 8B illustrates a hotness table 216b corresponding to FIG. 8A. A method of updating hotness of the latest logical address and the oldest logical address will be described with reference to FIG. 8B.

In operation S21, the classifier 231 may update hotness by reflecting the elapse index in hotness of the oldest logical address "30."

In the example in FIG. 8A, the logical address "30" may be last received in the 7th time, and the last index of the logical address "30" may be "7." The classifier 231 may determine the elapse index of the logical address "30" as "5" based on the current index "12" and the last index "7." According to Equation 1 described above, when the existing hotness of the logical address "30" was "3," the classifier 231 may update the hotness column with new hotness "1" obtained by subtracting "2" obtained by multiplying the elapse index "5," the decaying factor "0.2," and the count "2."

In operation S22, the classifier 231 may update the last index of the logical address "30" of which hotness has been updated to the current index "12."

In operation S23, the classifier 231 may remove the oldest logical address "30" from the logical address list 216a, and may update the count of the logical address "30" from "2" to "1" in the hotness table 216b.

In operation S24, the classifier 231 may determine hotness of the latest logical address "10," and may insert the logical address "10" into the logical address list 216a and hotness table 216b.

The logical address "10" may not be included in the existing logical address list 216a and the hotness table 216b. The classifier 231 may determine hotness of a logical address not included in the hotness table 216b to be an initial value. For example, the initial value may be determined to be the maximum weight. In the example in FIG. 8B, the classifier 231 may determine hotness of the logical address "10" as "2." Thereafter, the classifier 231 may determine the last index of the logical address "10" as "12," may determine the count as "1" and may insert the hotness, the last index, and the count of the logical address "10" into the hotness table 216b.

Figure 9A:
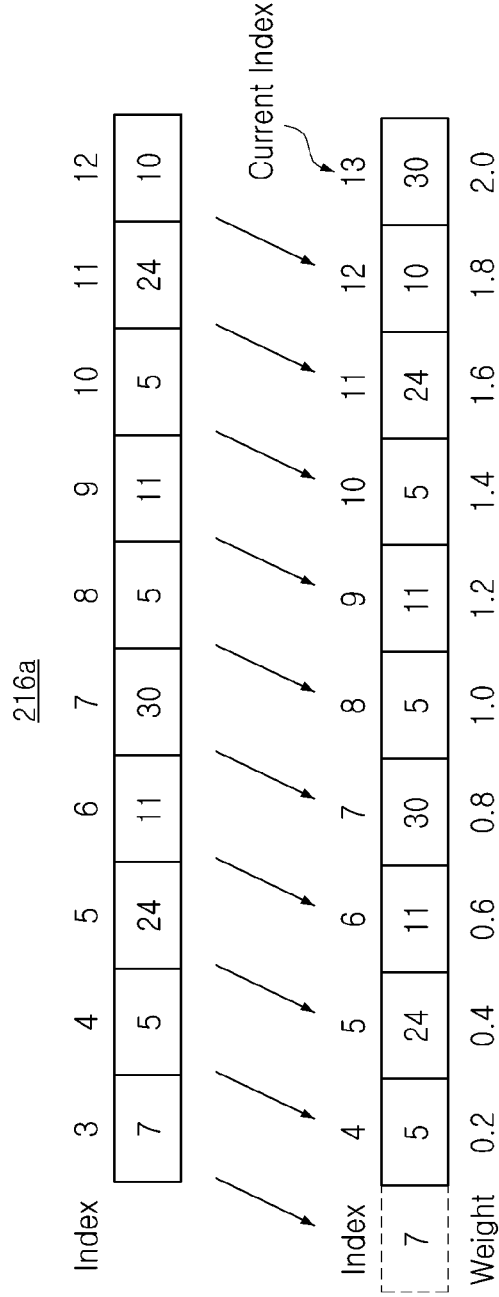

FIG. 9A illustrates an example in which a logical address is newly inserted into the logical address list 216a described with reference to FIG. 8A.

Referring to FIG. 9A, the thirteenth received logical address "30" from the host 100 may be inserted into the logical address list 216a and the third received logical address "7" may be removed from the logical address list 216a. The current index may be updated to "13." In the example in FIG. 9A, the logical address "7" may be completely removed from the logical address list 216a. The classifier 231 may remove hotness of the logical address "7" from the hotness table 216b.

FIG. 9B illustrates a hotness table 216b corresponding to FIG. 9A. A method of updating hotness of the latest logical address and the oldest logical address will be described with reference to FIG. 9B.

In operation S31, the classifier 231 may remove the oldest logical address "7" and hotness, the last index and the count thereof from the hotness table 216b.

In operation S32, the classifier 231 may update hotness by reflecting the elapse index in hotness of the latest logical address "30."

For example, the classifier 231 may determine the elapse index of the logical address "30" as "6" based on the current index "13" and the last index "7" of the logical address "30." According to Equation 2 described above, when the previous hotness of the logical address "30" was "1," the classifier 231 may update the hotness table 216b with hotness "2.8" determined by reflecting the elapse index "6," the decaying factor "0.2," the maximum weight "2," and the count "1."

In operation S33, the classifier 231 may insert the latest logical address "30" into the logical address table 216a, may update the last index of the latest logical address "30" from "7" to "13," and may update the count from "1" update to "2."

As described with reference to FIGS. 7A to 9B, the classifier 231 may update only hotness of the latest logical address and the oldest logical address among the logical addresses of the logical address list 216a, and may maintain the hotnesses of the other logical addresses in the logical address list 216a. In an example embodiment of the present disclosure, when the classifier 231 updates hotness of the latest logical address and the oldest logical address, the classifier 231 may reflect the elapse index indicating the existing reception tendency of the respective logical address. Accordingly, the classifier 231 may determine the relative hotness between the logical addresses included in the logical address list 216a without updating hotness of the other logical addresses.

In an example embodiment of the present disclosure, by updating only the hotness of the newest logical address and the oldest logical address no matter how many logical addresses are included in the logical address list, the storage device 200 may classify data received from the host 100 as hot data or cold data. Accordingly, the storage device 200 may quickly classify properties of data received from the host 100, may classify the data and may store the data in the nonvolatile memory 220. Accordingly, the storage device 200 may have improved access performance.

Figure 10:
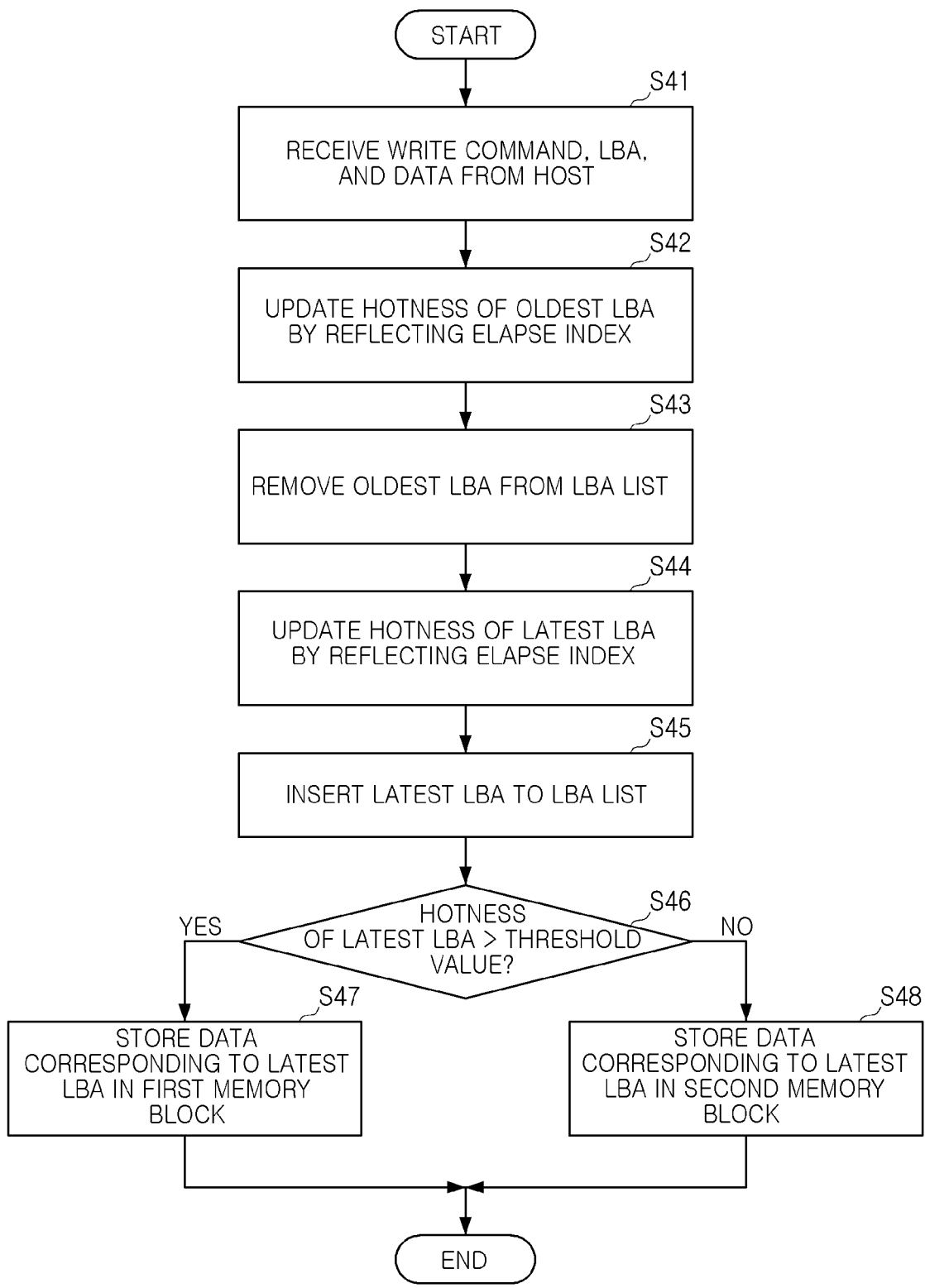
FIG. 10 is a flowchart illustrating a write operation of a storage device according to an example embodiment of the present disclosure.

FIG. 10 is a flowchart illustrating a write operation of a storage device according to an example embodiment of the present disclosure.

In operation S41, the storage device 200 may receive a write command, a logical address and data from the host 100.

In operation S42, the storage device 100 may update the hotness of the oldest logical address in the logical address list 216*a* by reflecting the elapse index of the logical address. As described with reference to FIGS. 7A to 9B, the elapse index may indicate how long ago the logical address was received from the host 100, in other words, the tendency in which the logical address is received from the host 100.

In operation S43, the storage device 200 may remove the oldest logical address from the logical address list 216*a*.

In operation S44, the storage device 200 may update the hotness of the latest logical address by reflecting the elapse index of the latest logical address. The elapse index of the latest logical address may be reflected by the storage device 200.

In operation S45, the storage device 200 may insert the latest logical address into the logical address list 216*a*.

In operation S46, the storage device 200 may determine whether the updated hotness of the latest logical address exceeds a threshold value. When the updated hotness exceeds the threshold value ("YES" in operation S46), the storage device 200 may store data corresponding to the latest logical address in the first memory block 220*a* in operation S47. In case in which the updated hotness does not exceed the threshold value ("No" in operation S46), the storage device 200 may store data corresponding to the latest logical address in a second memory block 220*b* in operation S48.

The example in which the storage device 200 may store hot data and cold data in two types of memory blocks having different bit densities based on the determination of hotness has been described with reference to FIGS. 5 to 10. However, the present disclosure is not limited thereto, and the present embodiment may be applied to the example in which three or more types of memory blocks having different bit densities are used to separately store data having various degrees of hotness.

Figure 11:
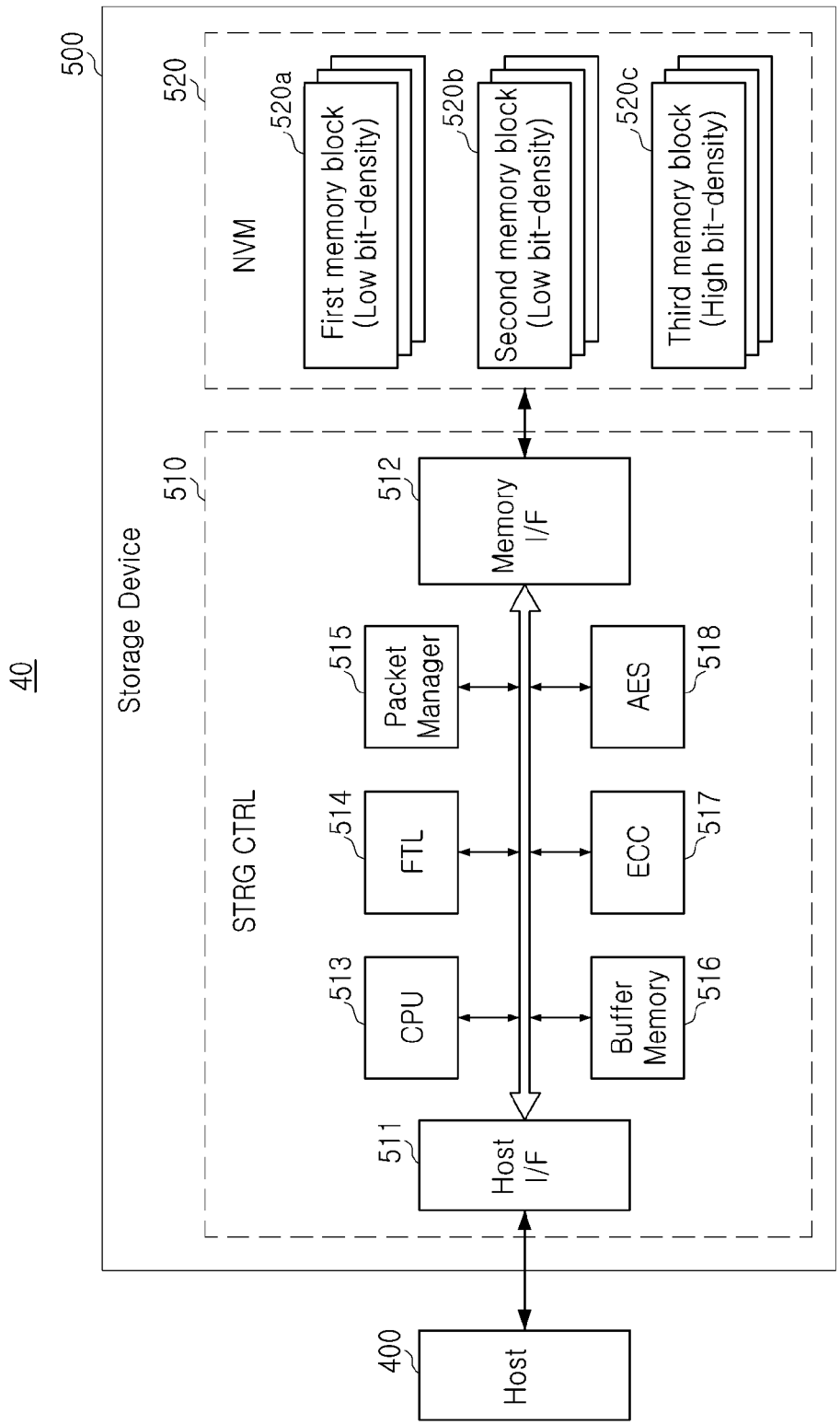
FIG. 11 is a block diagram illustrating a host-storage system according to an example embodiment of the present disclosure.

FIG. 11 is a block diagram illustrating a host-storage system according to an example embodiment of the present disclosure.

The host-storage system 40 may include a host 400 and a storage device 500. In addition, the storage device 500 may include a storage controller 510 and a nonvolatile memory (NVM) 520.

The host 400 may include an operating system generally managing and controlling functions and operations of the host 400, similarly to the host 100 described with reference to FIG. 1. In addition, similarly to the storage device 200 described with reference to FIG. 1, the storage device 500 may include storage media for storing data in response to a request from the host 400.

The storage controller 510 may include a host interface 511, a memory interface 512 and a CPU 513. In addition, the storage controller 510 may further include a flash translation layer 514, a packet manager 515, a buffer memory 516, an ECC engine 517, and an AES engine 518. The components included in the storage controller 510 may operate similarly to the components included in the storage controller 210 described with reference to FIG. 1.

The nonvolatile memory 520 may maintain stored data even when power is not supplied. The nonvolatile memory 520 may store data provided from the host 400 through a program operation, and may output data stored in the nonvolatile memory 520 through a read operation. The nonvolatile memory 520 may include a plurality of memory blocks, each of the plurality of memory blocks may include a plurality of pages, and each of the pages may include a plurality of memory cells connected to a word line.

The nonvolatile memory 520 may include first, second and third memory blocks 520*a*, 520*b* and 520*c* having different bit densities. In the example in FIG. 11, the first memory blocks 520*a* may have the lowest bit density, the second memory blocks 520*b* may have intermediate bit density, and the third memory blocks 520*c* may have the highest bit density. The first memory blocks 520*a* may have the lowest storage capacity in the same size of area, and may have a relatively high access speed and a relatively long lifespan. The third memory blocks 520*c* may have a relatively low access speed and a relatively short lifespan, and may have the highest storage capacity in the same size of area. The second memory blocks 520*b* may provide moderate storage capacity, a moderate speed, and a moderate lifespan.

Since the data stored in the nonvolatile memory 520 may be classified as hot data, warm data, and cold data according to the access frequency thereof, and may be stored in a first memory block 520*a*, a second memory block 520, and a third memory block 520*c* in a divided manner, the nonvolatile memory 520 may be efficiently used.

Figure 12:
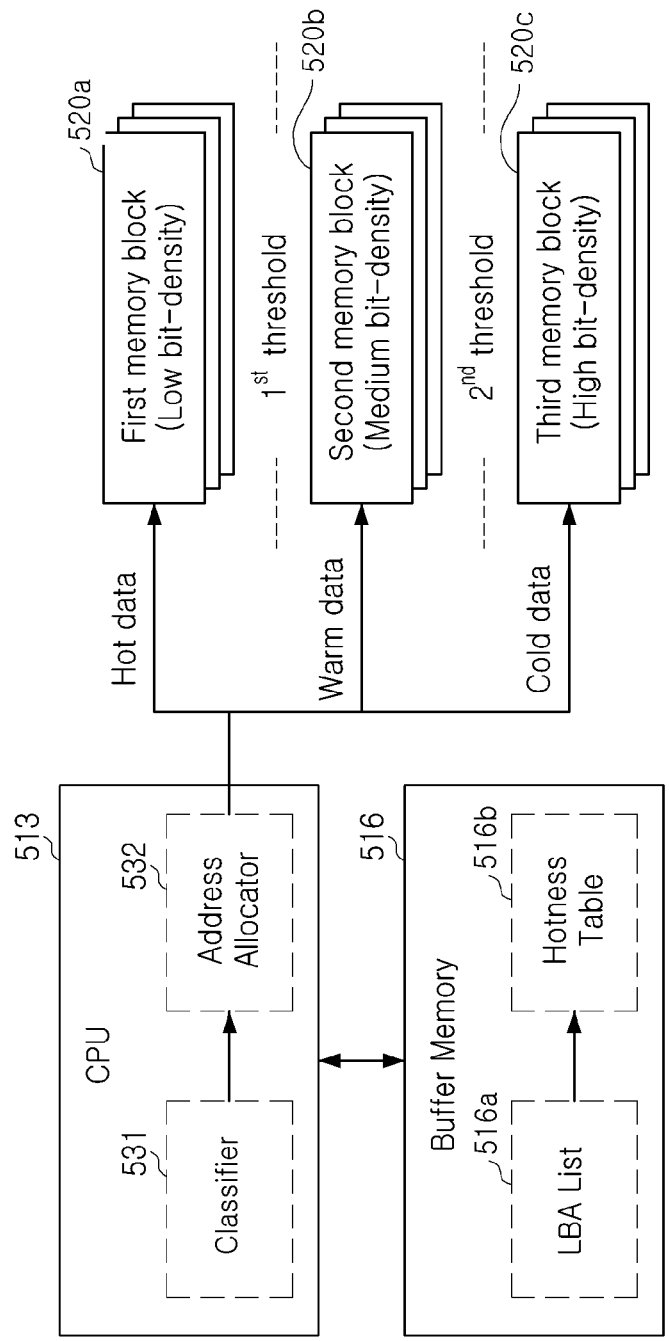
FIG. 12 is a diagram illustrating operations of a storage device according to an example embodiment of the present disclosure.

FIG. 12 is a diagram illustrating operations of a storage device according to an example embodiment of the present disclosure.

FIG. 12 illustrates the CPU 513, the buffer memory 516, and first to third memory blocks 520*a* to 520*c* of the storage device 500 described with reference to FIG. 11.

The CPU 513 may determine hotness of the data received from the host 400 with reference to information stored in the buffer memory 516, and may control the nonvolatile memory 520 such that the data may be stored in one of the first to third memory blocks 520*a* to 520*c* depending on hotness of the data. The first memory blocks 520*a* may have the lowest bit density, the second memory blocks 520*b* may have intermediate bit density, and the third memory blocks 520*c* may have the highest bit density. For example, the first memory block 520*a* may be an SLC memory block, the second memory block 520*b* may be a TLC memory block, and the third memory block 520*c* may be a QLC memory block, but the inventive concept is not limited thereto.

The CPU 513 may drive the classifier 531 and the address allocator 532. For example, the classifier 531 and the address allocator 532 may be loaded into a working memory and may be driven by the CPU 513.

The buffer memory 516 may store a logical address list 516*a* and a hotness table 516*b*. The classifier 531 may update hotness of the latest logical address received together with the command from the host 400 by referring to the logical address list 516*a* and the hotness table 516*b*. In an example embodiment of the present disclosure, the classifier 531 may update hotness of the latest logical address by reflecting the elapse index indicating how long the latest logical address has been accessed each time a logical address is received from the host 400.

The classifier 531 may determine whether data corresponding to the latest logical address is hot data, warm data, or cold data based on the updated hotness of the latest logical address. For example, the classifier 531 may determine the data as hot data when hotness of the latest logical address is greater than the first threshold value, and when the hotness is equal to or less than the first threshold value and greater than the second threshold value, the classifier 531 may determine the data as warm data, and when hotness is equal to or less than the second threshold value, the classifier 531 may determine the data as cold data.

The address allocator 532 may map the latest logical address to a physical address of the nonvolatile memory 520. For example, the address allocator 532 may map a logical address to a physical address such that hot data may be stored in the first memory block 520a, warm data may be stored in the second memory block 520b, and cold data may be stored in the third memory block 520c.

In an example embodiment of the present disclosure, when hotness of the latest logical address is updated, the storage device 500 may reflect the existing access tendency of the logical address in the hotness. Accordingly, the relative hotness of each logical address may be determined without updating the hotness of each logical address each time there is an access request from the host 400. Accordingly, the amount of computation of the storage device 500 for classifying data may be reduced, and access performance of the storage device 500 may improve.

The example in which the storage device 500 may include memory blocks having three types of bit densities, and may separately store data as hot data, warm data and cold data based on the two thresholds for hotness has been described with reference to FIGS. 1I to 12. However, the present disclosure is not limited thereto. For example, an example embodiment of the present disclosure may also be applied to a case in which the storage device stores data separately in memory blocks having N+1 types of bit densities based on N threshold values for hotness (N is a natural number).

Hereinafter, a structure of a memory device to which example embodiments of the present disclosure may be applied and an example of a system to which example embodiments of the present disclosure may be applied will be described with reference to FIGS. 13 to 14.

Figure 13:
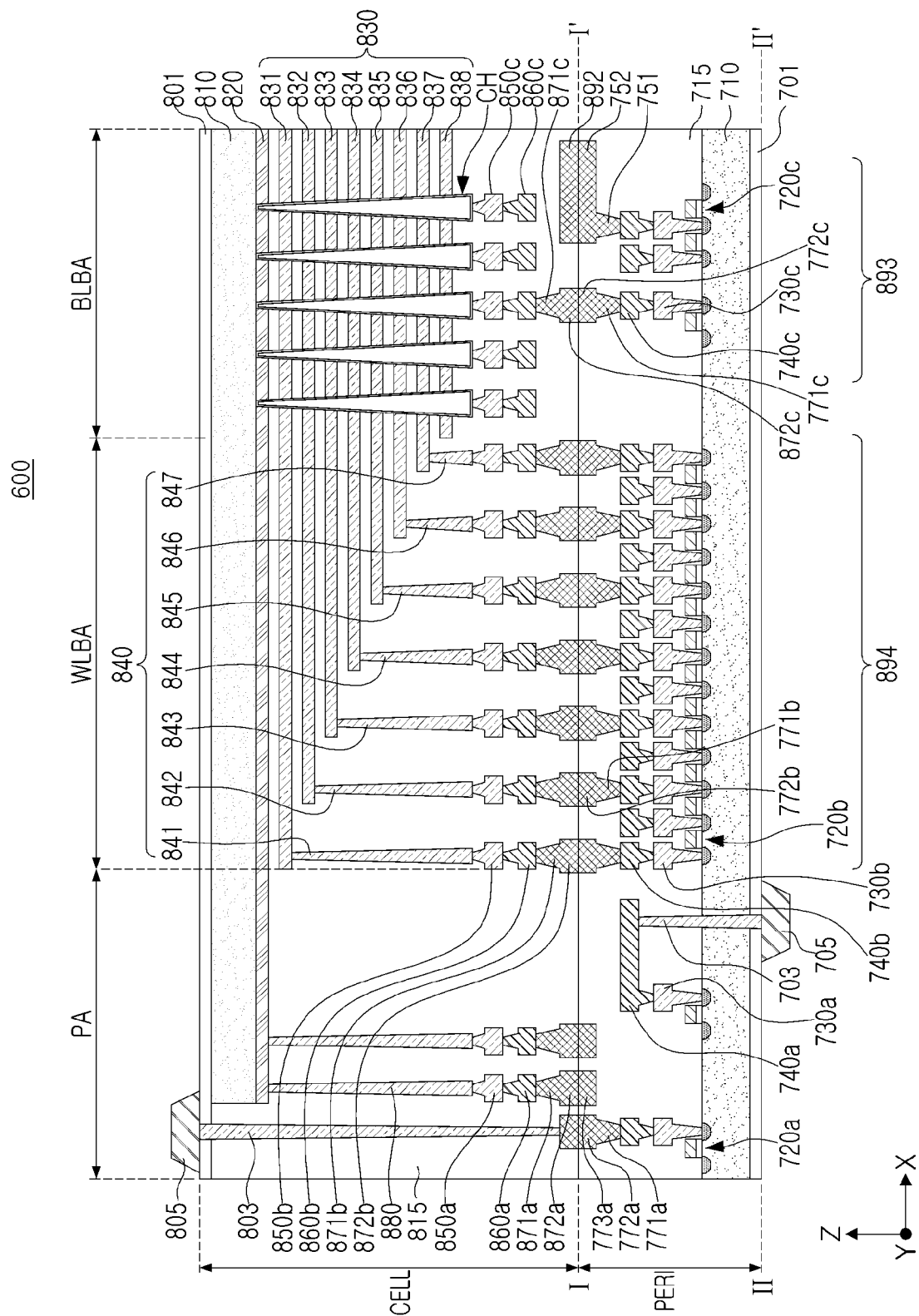
FIG. 13 is a cross-sectional diagram illustrating a memory device according to an example embodiment of the present disclosure.

FIG. 13 is a cross-sectional diagram illustrating a memory device according to an example embodiment of the present disclosure.

Referring to FIG. 13, a memory device 600 may have a chip to chip (C2C) structure. In the C2C structure, an upper chip including a cell region CELL may be manufactured on a first wafer, a lower chip including a peripheral circuit region PERI may be manufactured on a second wafer different from the first wafer, and the upper chip and the lower chip may be connected to each other by a bonding method. For example, the bonding method may be a method of electrically connecting a bonding metal formed in an uppermost metal layer of the upper chip to a bonding metal formed in an uppermost metal layer of the lower chip. For example, when the bonding metal is formed of copper (Cu), the bonding method may be a Cu—Cu bonding method, and the bonding metal may be formed of aluminum or tungsten.

Each of the peripheral circuit region PER) and the cell region CELL of the memory device 600 may include an external pad bonding region PA, a word line bonding region WLBA, and a bit line bonding region BLBA. The peripheral circuit region PERI may include a first substrate 710, an interlayer insulating layer 715, a plurality of circuit devices 720a, 720b, and 720c formed on the first substrate 710, first metal layers 730a, 730b, and 730c connected to the plurality of circuit devices 720a, 720b, and 720c, and second metal layers 740a, 740b, and 740c formed on the first metal layers 730a, 730b, and 730c. In an example embodiment of the present disclosure, the first metal layers 730a, 730b, and 730c may be formed of tungsten having relatively high resistance, and the second metal layers 740a, 740b, and 740c may be formed of copper having relatively low resistance.

In example embodiments of the present disclosure, only the first metal layers 730a, 730b, and 730c and the second metal layers 740a, 740b, and 740c are provided, but the present disclosure is not limited thereto, and at least one metal layer may be further formed on the second metal layers 740a, 740b, and 740c. At least a portion of the one or more metal layers formed on the second metal layers 740a, 740b, and 740c may be formed of aluminum having resistance lower than that of copper forming the second metal layers 740a, 740b, and 740c.

The interlayer insulating layer 715 may be disposed on the first substrate 710 to cover the plurality of circuit devices 720a, 720b, and 720c, the first metal layers 730a, 730b, and 730c, and the second metal layers 740a, 740b, and 740c and may include an insulating material such as silicon oxide or silicon nitride.

Lower bonding metals 771a and 772a may be formed on the second metal layer 740a of the external pad bonding region PA. In the external pad bonding region PA, the lower bonding metals 771a and 772a of the peripheral circuit region PERI may be electrically connected to the upper bonding metals 871a and 872a of the cell region CELL by a bonding method.

Lower bonding metals 771b and 772b may be formed on the second metal layer 740b of the word line bonding region WLBA. In the word line bonding region WLBA, the lower bonding metals 771b and 772b of the peripheral circuit region PERI may be electrically connected to the upper bonding metals 871b and 872b of the cell region CELL by a bonding method.

Lower bonding metals 771c and 772c may be formed on the second metal layer 740c of the bit line bounding region BLBA. In the external pad bonding region PA, the lower bonding metals 771c and 772c of the peripheral circuit region PERI may be electrically connected to the upper bonding metals 871c and 872c of the cell region CELL by a bonding method.

In addition, the lower bonding metals 771a, 771b, 771c, 772a, 772b and 772c and the upper bonding metals 871a, 871b, 871c, 872a, 872b and 872c may be formed of aluminum, copper, tungsten, or the like. The upper bonding metals 871a, 871b, 871c, 872a, 872b and 872c of the cell region CELL may be referred to as first metal pads, and the lower bonding metals 771a, 771b, 771c, 772a, 772b and 772c of the peripheral circuit region PERI may be referred to as second metal pads.

The cell region CELL may provide at least one memory block. The cell region CELL may include a second substrate 810 and a common source line 820. A plurality of word lines 831, 832, 833, 834, 835, 836, 837 and 838 (830) may be stacked on the second substrate 810 in a direction (Z-axis direction) perpendicular to the upper surface of the second substrate 810. String select lines and a ground select line may be disposed above and below the word lines 830, and a plurality of word lines 830 may be disposed between the string select lines and the ground select line.

In the bit line bonding region BLBA, the channel structure CH may extend in a direction perpendicular to the upper surface of the second substrate 810 and may penetrate the word lines 830, the string selection lines, and the ground selection line. The channel structure CH may include a data storage layer, a channel layer, and a buried insulating layer, and the channel layer may be electrically connected to the first metal layer 850c and the second metal layer 860c. For example, the first metal layer 850c may be a bit line contact, and the second metal layer 860c may be a bit line. In an example embodiment of the present disclosure, the bit line may extend in a first direction (Y-axis direction) parallel to the upper surface of the second substrate 810.

In the example embodiment illustrated in FIG. 13, a region in which the channel structure CH and the bit line are disposed may be referred to as the bit line bonding region BLBA. The bit line may be electrically connected to the circuit devices 720c providing the page buffer 893 in the peripheral circuit region PERI in the bit line bonding region BLBA. As an example, the bit line may be connected to the upper bonding metals 871c and 872c in the peripheral circuit region PERI, and the upper bonding metals 871c and 872c may be connected to the lower bonding metals 771c and 772c connected to the circuit devices 720c of the page buffer 893.

In the word line bonding region WLBA, the word lines 830 may extend in a second direction (X-axis direction) parallel to the upper surface of the second substrate 810, and may be connected to a plurality of cell contact plugs. 841, 842, 843, 844, 845, 846 and 847 (840). The word lines 830 and the cell contact plugs 840 may be connected to each other in pads provided by at least a portion of the word lines 830 extending by different lengths in the second direction (X-axis direction). A first metal layer 850b and a second metal layer 860b may be connected to the upper portions of the cell contact plugs 840 connected to the word lines 830 in sequence. In the word line bonding region WLBA, the cell contact plugs 840 may be connected to the peripheral circuit region PERI through the upper bonding metals 871b and 872b of the cell region CELL and the lower bonding metals 771b and 772b of the peripheral circuit region PERI.

The cell contact plugs 840 may be electrically connected to the circuit devices 720b providing the row decoder 894 in the peripheral circuit region PERI. In an example embodiment of the present disclosure, the operating voltages of the circuit devices 720b providing the row decoder 894 may be different from the operating voltages of the circuit devices 720c providing the page buffer 893. For example, the operating voltages of the circuit devices 720c providing the page buffer 893 may be greater than the operating voltages of the circuit devices 720b providing the row decoder 894.

A common source line contact plug 880 may be disposed in the external pad bonding region PA. The common source line contact plug 880 may be formed of a metal, a metal compound, or a conductive material such as polysilicon, and may be electrically connected to the common source line 820. A first metal layer 850a and a second metal layer 860a may be stacked on the common source line contact plug 880 in sequence. For example, the region in which the common source line contact plug 880, the first metal layer 850a, and the second metal layer 860a are disposed may be referred to as an external pad bonding region PA.

Input/output pads 705 and 805 may be disposed in the external pad bonding region PA. Referring to FIG. 13, a lower insulating film 701 covering the lower surface of the first substrate 710 may be formed below the first substrate 710, and first input/output pad 705 may be formed on the lower insulating film 701. The first input/output pad 705 may be connected to at least one of the plurality of circuit devices 720a, 720b and 720c disposed in the peripheral circuit region PERI through the first input/output contact plug 703, and may be separated from the first substrate 710 by the lower insulating film 701. In addition, a side insulating film may be disposed between the first input/output contact plug 703 and the first substrate 710 and may electrically isolate the first input/output contact plug 703 from the first substrate 710.

Referring to FIG. 13, an upper insulating film 801 covering the upper surface of the second substrate 810 may be formed on the second substrate 810, and a second input/output pad 805 may be disposed on the upper insulating film 801. The second input/output pad 805 may be connected to at least one of the plurality of circuit devices 720a, 720b, and 720c disposed in the peripheral circuit region PERI through the second input/output contact plug 803.

In example embodiments of the present disclosure, the second substrate 810 and the common source line 820 may not be disposed in the region in which the second input/output contact plug 803 is disposed. In addition, the second input/output pad 805 may not overlap the word lines 830 in the third direction (Z-axis direction). Referring to FIG. 13, the second input/output contact plug 803 may be separated from the second substrate 810 in a direction parallel to the upper surface of the second substrate 810, may penetrate an interlayer insulating layer 815 of the cell region CELL and may be connected to the second input/output pad 805.

In example embodiments of the present disclosure, the first input/output pad 705 and the second input/output pad 805 may be selectively formed. For example, the memory device 600 may only include the first input/output pad 705 disposed on the first substrate 710, or may only include the second input/output pad 805 disposed on the second substrate 810. Alternatively, the memory device 600 may include both the first input/output pad 705 and the second input/output pad 805.

In each of the external pad bonding region PA and the bit line bonding region BLBA included in the cell region CELL and the peripheral circuit region PERI, respectively, the metal pattern of the uppermost metal layer may be present as a dummy pattern, or an uppermost metal layer may be empty.

In the external pad bonding region PA, the memory device 600 forms a lower metal pattern 773a having the same shape as that of the upper metal pattern 872a of the cell region CELL on the uppermost metal layer of the peripheral circuit region PERI to correspond to the upper metal pattern 872a formed on the uppermost metal layer of the cell region CELL. The lower metal pattern 773a formed on the uppermost metal layer of the peripheral circuit region PERI may not be connected to a contact in the peripheral circuit region PERT. Similarly, an upper metal pattern having the same shape as that of the lower metal pattern of the peripheral circuit region PERI may be formed on the upper metal layer of the cell region CELL to correspond to the lower metal pattern formed in the uppermost metal layer of the peripheral circuit region PERI in the external pad bonding region PA.

Lower bonding metals 771b and 772b may be formed on the second metal layer 740b of the word line bonding region WLBA. In the word line bonding region WLBA, the lower bonding metals 771b and 772b of the peripheral circuit region PERI may be electrically connected to the upper bonding metals 871b and 872b of the cell region CELL by a bonding method.

In addition, in the bit line bonding region BLBA, an upper metal pattern 892 having the same shape as that of the lower metal pattern 752 of the peripheral circuit region PERI may be formed on the uppermost metal layer of the cell region CELL to correspond to the lower metal pattern 752 formed on the uppermost metal layer of the peripheral circuit region PERI. The lower metal pattern 752 may formed on the lower metal pattern 751. In an example embodiment of the present disclosure, a contact may not be formed on the upper metal pattern 892 formed on the uppermost metal layer of the cell region CELL.

In an example embodiment of the present disclosure, a reinforced metal pattern having the same cross-sectional shape as that of the formed metal pattern may be formed on the uppermost metal layer of the other of the cell region CELL and the peripheral circuit region PERT to correspond to the metal pattern formed in the uppermost metal layer of one of the cell region CELL and the peripheral circuit region PERI. A contact may not be formed in the reinforced metal pattern.

The memory device 600 may include memory blocks having different bit densities depending on the number of bits stored in the memory cells. In an example embodiment of the present disclosure, hotness of data may be swiftly classified and data may be stored in memory blocks having different bit densities in a divided manner depending on hotness of data, such that the lifespan of the memory device 600 and an average access speed may improve.

Figure 14:
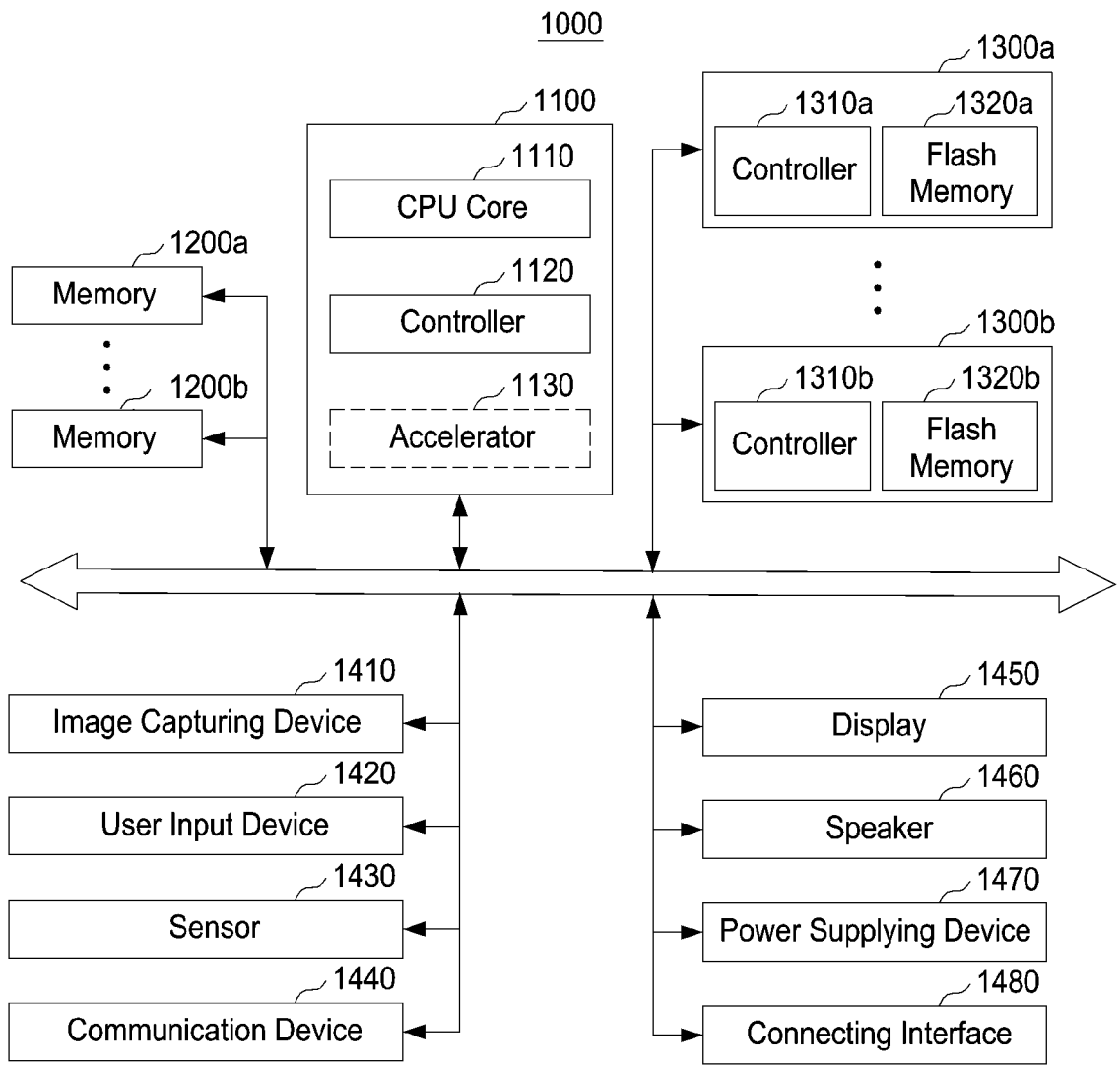
FIG. 14 is a diagram illustrating a system to which a storage device is applied according to an example embodiment of the present disclosure.

FIG. 14 is a diagram illustrating a system to which a storage device is applied according to an example embodiment of the present disclosure. The system 1000 in FIG. 14 may be implemented as a mobile system such as a mobile phone, a smart phone, a tablet personal computer (PC), a wearable device, a healthcare device, or an Internet of things (IOT) device. However, the system 1000 in FIG. 14 is not necessarily limited to a mobile system, and may be implemented as a personal computer, a laptop computer, a server, a media player, or an automotive device such as a navigation system.

Referring to FIG. 14, the system 1000 may include a main processor 1100, memories 1200*a* and 1200*b*, and storage devices 1300*a* and 1300*b*, and may further include one or more of an image capturing device 1410, a user input device 1420, a sensor 1430, a communication device 1440, a display 1450, a speaker 1460, a power supplying device 1470, and a connecting interface 1480.

The main processor 1100 may control overall operations of the system 1000, and may control operations of the other components included in the system 1000. The main processor 1100 may be implemented as a general-purpose processor, a dedicated processor, or an application processor.

The main processor 1100 may include one or more CPU cores 1110, and may further include a controller 1120 for controlling the memories 1200*a* and 1200*b* and/or the storage devices 1300*a* and 1300*b*. In example embodiments of the present disclosure, the main processor 1100 may further include an accelerator 1130 which may be a dedicated circuit for high-speed data operation such as artificial intelligence (AI) data operation. The accelerator 1130 may include a graphics processing unit (GPU), a neural processing unit (NPU), and/or a data processing unit (DPU), and may be implemented as a chip physically independent from the other components of the main processor 1100.

The memories 1200*a* and 1200*b* may be used as the main memory device of the system 1000 and may include a volatile memory such as static random access memory (SRAM) and/or dynamic RAM (DRAM), or may include a nonvolatile memory such as a flash memory, phase-change RAM (PRAM) and/or resistive RAM (RRAM). The memories 1200*a* and 1200*b* may be implemented in the same package as the main processor 1100.

The storage devices 1300*a* and 1300*b* may function as nonvolatile storage devices storing data regardless of whether power is supplied or not, and may have a relatively large storage capacity as compared to the memories 1200*a* and 1200*b*. The storage devices 1300*a* and 1300*b* may include storage controllers 1310*a* and 1310*b* and nonvolatile memories (NVM) 1320*a* and 1320*b* for storing data under the control of the storage controllers 1310*a* and 1310*b*. The nonvolatile memories 1320*a* and 1320*b* may include a flash memory having a two dimensional (2D) structure or three-dimensional (3D) vertical NAND (V-NAND) structure, or may include other types of nonvolatile memories such as PRAM and/or RRAM.

The storage devices 1300*a* and 1300*b* may be included in the system 1000 in a state of being physically separated from the main processor 1100, or may be implemented in the same package as the main processor 1100. In addition, the storage devices 1300*a* and 1300*b* may have the same shape as that of a solid state device (SSD) or a memory card, such that the storage devices 1300*a* and 1300*b* may be detachably coupled to the other components of the system 1000 through an interface such as a connection interface 1480 to be described later. The storage devices 1300*a* and 1300*b* may fall under standard protocols such as Universal Flash Storage (UFS), embedded multimedia card (eMMC), or nonvolatile memory express (NVMe), but the present disclosure is not limited thereto.

The storage devices 1300*a* and 1300*b* in an example embodiment of the present disclosure may include memory blocks having different bit densities. The storage devices 1300*a* and 1300*b* may rapidly update hotness of recently accessed data by reflecting an elapse index indicating how long ago the recently accessed data from the host was previously accessed. The storage devices 1300*a* and 1300*b* may provide high access performance and high lifespan by storing data in memory blocks having different bit densities in a divided manner according to hotness of the data.

The image capturing device 1410 may obtain a still image or videos, and may be implemented as a camera, a camcorder, and/or a webcam.

The user input device 1420 may receive various types of data input from a user of the system 1000, and may be implemented as a touch pad, a keypad, a keyboard, a mouse, and/or a microphone.

The sensor 1430 may detect various types of physical quantities obtained from an external entity of the system 1000, and may convert the sensed physical quantities into electrical signals. The sensor 1430 may include a temperature sensor, a pressure sensor, an illuminance sensor, a position sensor, an acceleration sensor, a biosensor and/or a gyroscope sensor.

The communication device 1440 may transmit signals to and receive signals from other external devices of the system 1000 in accordance with various communication protocols. The communication device 1440 may include an antenna, a transceiver, and/or a modem (MODEM).

The display 1450 and the speaker 1460 may function as output devices for outputting visual information and auditory information to the user of the system 1000, respectively.

The power supply device 1470 may appropriately convert power supplied from a battery built in the system 1000 and/or an external power source and may supply the power to each component of the system 1000.

The connection interface 1480 may provide a connection between the system 1000 and an external device connected to the system 1000 and exchanging data with the system 1000. The connection interface 1480 may be implemented by various interface methods, such as an advanced technology attachment (ATA), serial ATA (SATA), external SATA (e-SATA), small computer small interface (SCSI), serial attached SCSI (SAS), peripheral component interconnection (PCI), PCIe (PCI express), NVMe, IEEE 1394, universal serial bus (USB), secure digital (SD) card, multimedia card (MMC), eMMC, UFS, embedded Universal Flash Storage (eUFS), or compact flash (CF) card.

According to the aforementioned example embodiments, configurations and operations related to a storage device for storing hot data and cold data in memory blocks having different bit densities in a divided manner may be provided.

In addition, a storage device which may determine the relative hotness of the latest logical address in relation to a predetermined number of logical addresses without manually updating hotness of the predetermined number of recently received logical addresses whenever the latest logical address is received from the host may be provided.

In addition, a storage device which may reduce the amount of computation required to determine hotness of the latest logical address may be provided.

Further, a storage device which may swiftly classify data from a host and may store the data in memory blocks having different bit densities may be provided.

While the example embodiments of the present disclosure have been illustrated and described above, it will be apparent to those skilled in the art that modifications and variations could be made thereto without departing from the scope of the present disclosure as set forth by the appended claims.

What is claimed is:

1. A storage device, comprising:
a memory device including a plurality of memory blocks having different bit densities; and
a controller configured to control the memory device, wherein the controller includes:
a memory configured to store a logical address list including a number of recently received logical addresses and a hotness table including a hotness of each of the logical addresses included in the logical address list; and
a processor configured to receive a write command, a latest logical address and data from a host, to update a hotness of the latest logical address in the hotness table, to insert the latest logical address into the logical address list, and to control the memory device to program the data into one of the plurality of memory blocks depending on whether the hotness of the latest logical address exceeds a threshold value,
wherein the processor updates the hotness of the latest logical address based on a weight of the latest logical address, a decaying factor which corresponds to an interval at which the weight decreases, and an elapse index which is multiplied by the decaying factor and is determined based on how long ago that same logical address was received.

2. The storage device of claim 1, wherein the processor is configured to update a hotness of an oldest logical address, and to remove the oldest logical address from the logical address list, wherein the hotness of the oldest logical address is updated based on how long ago a logical address the same as the oldest logical address was received.

3. The storage device of claim 1, wherein the memory maintains the hotness of logical addresses other than the latest logical address and an oldest logical address among the logical addresses included in the logical address list in the hotness table.

4. The storage device of claim 2, wherein the processor updates the hotness of the oldest logical address based on Equation 1 below:

$$(\text{hotness}) = (\text{previous hotness}) - (\text{elapse index}) * (\text{decaying factor}) * (\text{count}) \quad [\text{Equation 1}]$$

where the previous hotness is the hotness of the oldest logical address before being updated, the elapse index is obtained by subtracting a last index of the oldest logical address from a current index, the count is the number of logical addresses the same as the oldest logical address in the logical address list, and the decaying factor is a constant value.

5. The storage device of claim 4, wherein the current index is an order in which the latest logical address was received, and the last index is an order in which a logical address the same as the oldest logical address was last received.

6. The storage device of claim 1, wherein the processor updates the hotness of the latest logical address based on Equation 2 below:

$$(\text{hotness}) = (\text{previous hotness}) - (\text{elapse index}) * (\text{decaying factor}) * (\text{count}) + (\text{weight}) \quad [\text{Equation 2}]$$

where the previous hotness is the hotness of the latest logical address before being updated, the elapse index is a value obtained by subtracting a last index of the latest logical address from a current index, and the decaying factor and the weight are constant values.

7. The storage device of claim 6, wherein the decaying factor is obtained by dividing the weight by the number of entries in the logical address list.

8. The storage device of claim 6, wherein, the current index is an order in which the latest logical address was received, and the last index is an order in which a logical address the same as the latest logical address was last received before the latest logical address was received.

9. The storage device of claim 6, wherein, when the logical address list does not include a logical address the same as the latest logical address before the latest logical address is inserted into the logical address list, the processor determines the hotness of the latest logical address to be an initial value.

10. The storage device of claim 9, wherein the initial value is the maximum weight.

11. The storage device of claim 1,
wherein the plurality of memory blocks include first memory blocks and second memory blocks, the first memory block stores N-bit data in a single memory cell, where N is a natural number, and the second memory block stores M-bit data in a single memory cell, where M is a natural number greater than N,
wherein the processor maps the latest logical address to one of the first memory blocks when the hotness of the latest logical address exceeds the threshold value, and the processor maps the latest logical address to one of the second memory blocks when the hotness of the latest logical address is equal to or less than the threshold value.

12. A method of operating a storage device including first memory blocks and second memory blocks having different bit densities, the method comprising:
receiving a write command, a latest logical address and data from a host;

updating a hotness of an oldest logical address in a logical address list that includes a number of recently received logical addresses, wherein the hotness of the oldest logical address is updated based on how long ago a logical address the same as the oldest logical address was received;

updating a hotness of the latest logical address; and storing the data in the first memory block or the second memory block depending on whether the hotness of the latest logical address is greater than a threshold value, wherein the hotness of the latest logical address is updated based on a weight of the latest logical address, a decaying factor which corresponds to an interval at which the weight decreases, and an elapse index which is multiplied by the decaying factor and is determined based on how long ago that same logical address was received.

13. The method of claim 12, further comprising:

maintaining hotnesses of logical addresses other than the latest logical address and the oldest logical address among the logical addresses included in the logical address list in a hotness table including hotnesses of the logical addresses included in the logical address list.

14. The method of claim 12, further comprising:

removing the oldest logical address from the logical address list after updating the hotness of the oldest logical address; and inserting the latest logical address into the logical address list after updating the hotness of the latest logical address.

15. The method of claim 12, wherein updating the hotness of the oldest logical address is performed based on Equation 1 below:

$$(\text{hotness}) = (\text{previous hotness}) - (\text{elapse index}) * (\text{decaying factor}) * (\text{count}) \qquad [\text{Equation 1}]$$

where the previous hotness is the hotness of the oldest logical address before being updated, the elapse index is obtained by subtracting a last index of the oldest logical address from a current index, the count is the number of logical addresses the same as the oldest logical address in the logical address list, and the decaying factor is a constant value.

16. The method of claim 12, wherein updating the hotness of the latest logical address is performed based on Equation 2 below:

$$(\text{hotness}) = (\text{previous hotness}) - (\text{elapse index}) * (\text{decaying factor}) * (\text{count}) + (\text{weight}) \qquad [\text{Equation 2}]$$

where the previous hotness is the hotness of the latest logical address before being updated, the elapse index is obtained by subtracting a last index of the latest logical address from a current index, and the decaying factor and the weight are constant values.

17. The method of claim 16, wherein the decaying factor is obtained by dividing the weight by the number of entries in the logical address list.

18. The method of claim 12, wherein updating the hotness of the latest logical address includes determining that the hotness of the latest logical address is an initial value when the logical address list does not include a logical address the same as the latest logical address.

19. A controller configured to control a memory device including a plurality of memory blocks having different bit densities, the controller comprising:

a memory configured to store a logical address list including a number of recently received logical addresses; and a processor configured to receive a write command, a latest logical address and data from a host, to update a hotness of the latest logical address, to insert the latest logical address into the logical address list, and to control the memory device to store the data in one of the memory blocks having different bit densities according to the hotness of the latest logical address, wherein the processor updates the hotness of the latest logical address based on a weight of the latest logical address, a decaying factor which corresponds to an interval at which the weight decreases, and an elapse index which is multiplied by the decaying factor and is determined based on how long ago that same address was received.

20. The controller of claim 19, wherein the processor is configured to update a hotness of an oldest logical address, and to remove the oldest logical address from the logical address list, wherein the hotness of the oldest logical address is updated based on how long ago a logical address the same as the oldest logical address was received.

* * * * *